US011674801B2

(12) United States Patent
Morris et al.

(10) Patent No.: US 11,674,801 B2
(45) Date of Patent: *Jun. 13, 2023

(54) SENSOR ROD ASSEMBLY FOR MEASURING ELEVATIONS

(71) Applicant: LASER ELEVATIONS, LLC, Bellevue, NE (US)

(72) Inventors: Andrew Morris, Bellevue, NE (US); Aaron Dale, Lenexa, KS (US); William Hendricks, Lenexa, KS (US); Rob Ochs, Lenexa, KS (US); Bruce Ploetz, Lenexa, KS (US); Tim Stark, Lenexa, KS (US)

(73) Assignee: Laser Elevations, LLC, Bellevue, NE (US)

( * ) Notice: Subject to any disclaimer, the term of this patent is extended or adjusted under 35 U.S.C. 154(b) by 103 days.

This patent is subject to a terminal disclaimer.

(21) Appl. No.: 17/089,574

(22) Filed: Nov. 4, 2020

(65) Prior Publication Data

US 2021/0293540 A1 Sep. 23, 2021

Related U.S. Application Data

(63) Continuation-in-part of application No. 15/627,340, filed on Jun. 19, 2017, now Pat. No. 10,871,373.

(Continued)

(51) Int. Cl.
*G01C 15/00* (2006.01)
*G01C 5/00* (2006.01)

(52) U.S. Cl.
CPC ............. *G01C 15/006* (2013.01); *G01C 5/00* (2013.01)

(58) Field of Classification Search
CPC ........ G01C 15/00; G01C 15/006; G01C 5/00; G01C 15/06; G01C 25/00
See application file for complete search history.

(56) References Cited

U.S. PATENT DOCUMENTS

| 3,649,122 A | 3/1972 | Holtz |
| 3,894,230 A | 7/1975 | Rorden et al. |

(Continued)

FOREIGN PATENT DOCUMENTS

DE 202014100454 U1 2/2014

OTHER PUBLICATIONS

PCT International Search Report and Written Opinion for International Application No. PCT/US2021/34898 dated Aug. 24, 2021, 20 pages.

*Primary Examiner* — Tung S Lau
(74) *Attorney, Agent, or Firm* — Suiter Swantz pc llo

(57) ABSTRACT

A sensor rod assembly includes a master stick and an extension stick, where the master stick and the at least one extension stick are couplable together via at least one of a physical coupling, an electrical coupling, or a communicative coupling. The sensor rod assembly includes a controller with one or more processors, where the one or more processors are communicatively coupled to at least one set of detection circuitry and a user interface, where the one or more processors are configured to execute a set of program instructions configured to cause the one or more processors to receive one or more detection signals from at least one of the master stick or the extension stick and configured to cause the one or more processors to determine an elevation of a laser light based on the received one or more detection signals.

27 Claims, 30 Drawing Sheets

Related U.S. Application Data

(60) Provisional application No. 62/351,676, filed on Jun. 17, 2016.

(56) References Cited

U.S. PATENT DOCUMENTS

| | | | |
|---|---|---|---|
| 4,005,388 A | 1/1977 | Morley et al. | |
| 4,029,415 A | 6/1977 | Johnson | |
| 4,054,385 A | 10/1977 | Wheable | |
| D273,788 S | 5/1984 | Ault | |
| 4,673,287 A | 6/1987 | Rickus | |
| 4,693,598 A | 9/1987 | Sehr | |
| 4,730,920 A | 3/1988 | Schlemmer et al. | |
| D297,950 S | 10/1988 | Yubisui et al. | |
| 4,820,041 A | 4/1989 | Davidson et al. | |
| 4,830,489 A * | 5/1989 | Cain | G01C 15/004 356/73 |
| D307,289 S | 4/1990 | Sakaguchi et al. | |
| 5,030,840 A | 7/1991 | Sommen | |
| D345,147 S | 3/1994 | Fukutake et al. | |
| D356,299 S | 3/1995 | Hamilton et al. | |
| 5,801,834 A | 9/1998 | Danielson et al. | |
| 6,302,355 B1 * | 10/2001 | Sallee | G01S 7/4802 342/63 |
| D478,824 S | 8/2003 | Concari | |
| D484,917 S | 1/2004 | Hunt et al. | |
| 7,012,237 B1 | 3/2006 | Ake | |
| 7,019,278 B2 | 3/2006 | Douglas | |
| 7,030,361 B2 | 4/2006 | Douglas | |
| 7,190,439 B2 | 3/2007 | Burkhart, Jr. | |
| D540,268 S | 4/2007 | Derocher et al. | |
| 7,323,673 B1 | 1/2008 | Ake et al. | |
| D571,237 S | 6/2008 | Hersey et al. | |
| 7,385,168 B2 * | 6/2008 | Cartlidge | G02B 21/24 359/215.1 |
| 7,414,704 B1 | 8/2008 | Nau | |
| D577,299 S | 9/2008 | Hersey et al. | |
| D578,416 S | 10/2008 | Concari | |
| D589,826 S | 4/2009 | Kiesel | |
| 7,633,634 B2 | 12/2009 | Spalding et al. | |
| 8,044,335 B2 | 10/2011 | Katayama | |
| 8,132,802 B2 | 3/2012 | Kolodge et al. | |
| D687,726 S | 8/2013 | Aglassinger | |
| D688,575 S | 8/2013 | Kokkonen et al. | |
| D742,858 S | 11/2015 | Morisawa | |
| 9,277,206 B1 | 3/2016 | Lloyd et al. | |
| D767,657 S | 9/2016 | Fukunaga et al. | |
| D778,264 S | 2/2017 | Stapelbroek et al. | |
| 9,618,619 B2 | 4/2017 | Rezk et al. | |
| 10,119,816 B2 | 11/2018 | Slotwinski et al. | |
| D857,663 S | 8/2019 | Knie | |
| D887,290 S | 6/2020 | Ranieri | |
| 10,697,755 B1 * | 6/2020 | Peters | G01B 21/042 |
| 10,871,373 B1 * | 12/2020 | Morris | G01C 15/006 |
| D967,420 S | 10/2022 | Sun | |
| 2002/0060788 A1 * | 5/2002 | Ohtomo | G01S 5/16 356/139.1 |
| 2006/0087641 A1 | 4/2006 | Burkhart | |
| 2006/0111809 A1 | 5/2006 | Etter et al. | |
| 2006/0124323 A1 * | 6/2006 | Glover | E02F 9/26 172/2 |
| 2006/0192081 A1 * | 8/2006 | Cartlidge | G02B 27/0012 250/208.1 |
| 2009/0103112 A1 | 4/2009 | Nygaard | |
| 2009/0322540 A1 | 12/2009 | Richardson et al. | |
| 2010/0073687 A1 | 3/2010 | Spalding et al. | |
| 2010/0157283 A1 | 6/2010 | Kirk et al. | |
| 2011/0315834 A1 | 12/2011 | Lukic et al. | |
| 2012/0236286 A1 * | 9/2012 | Layton | F41G 3/323 356/4.01 |
| 2015/0268043 A1 | 9/2015 | McFadden et al. | |
| 2016/0091282 A1 | 3/2016 | Baker et al. | |
| 2016/0120414 A1 | 5/2016 | Darley et al. | |
| 2016/0180440 A1 | 6/2016 | Dibenedetto et al. | |
| 2017/0173262 A1 * | 6/2017 | Veltz | G16H 20/17 |
| 2017/0347899 A1 | 12/2017 | Bhushan et al. | |
| 2018/0174420 A1 | 6/2018 | Clark et al. | |
| 2019/0313525 A1 | 10/2019 | Nagano et al. | |
| 2021/0293540 A1 | 9/2021 | Morris et al. | |

* cited by examiner

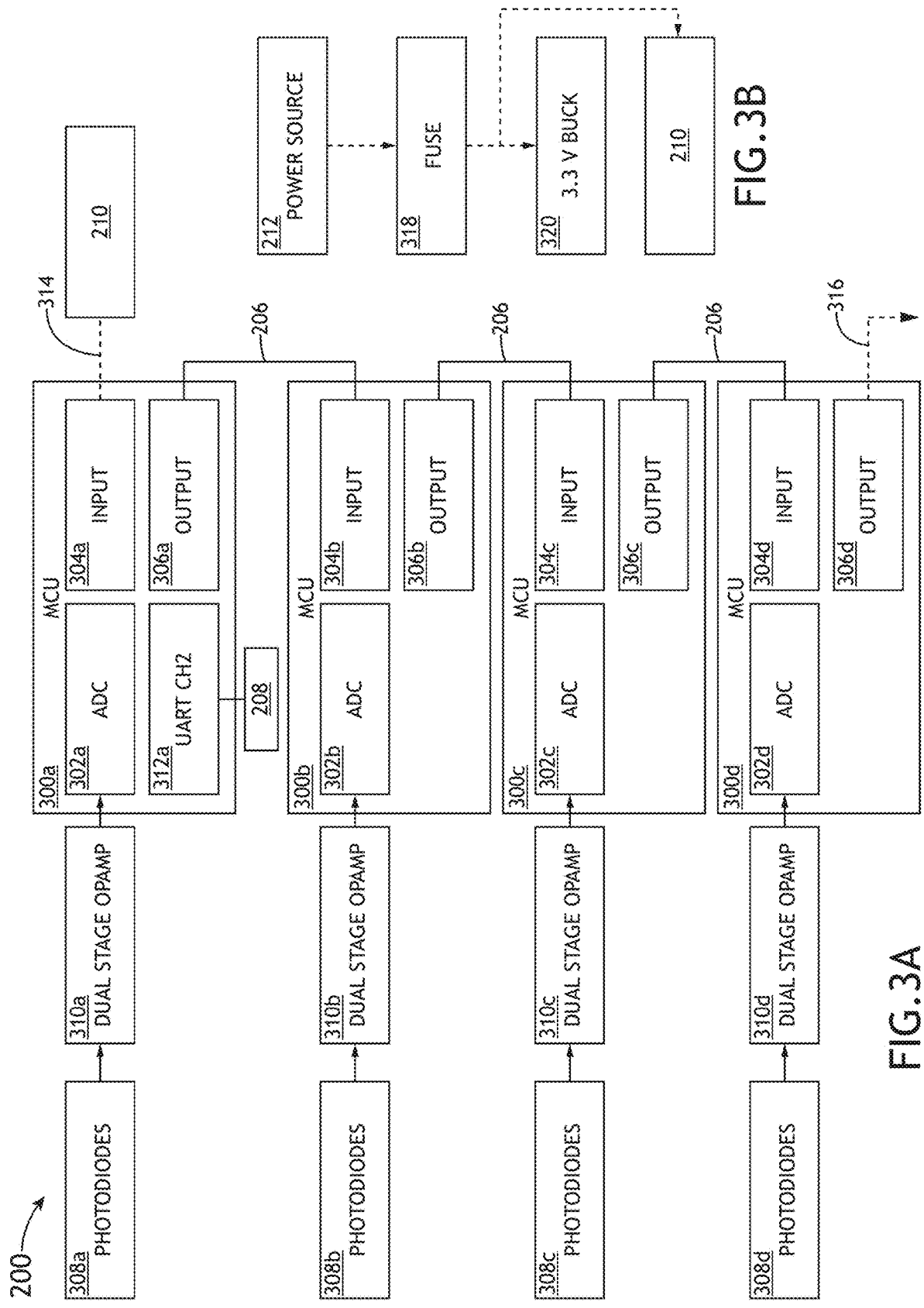

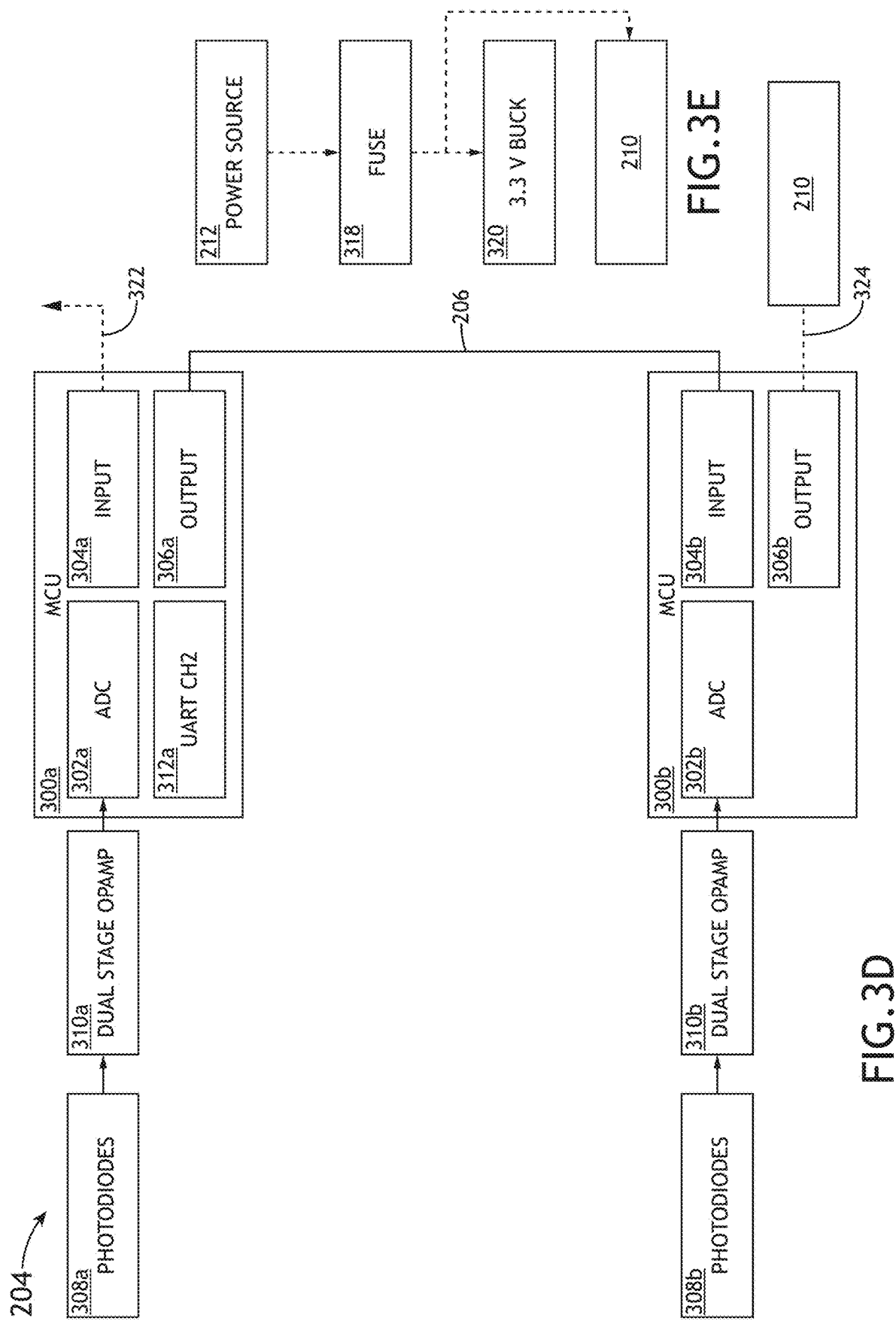

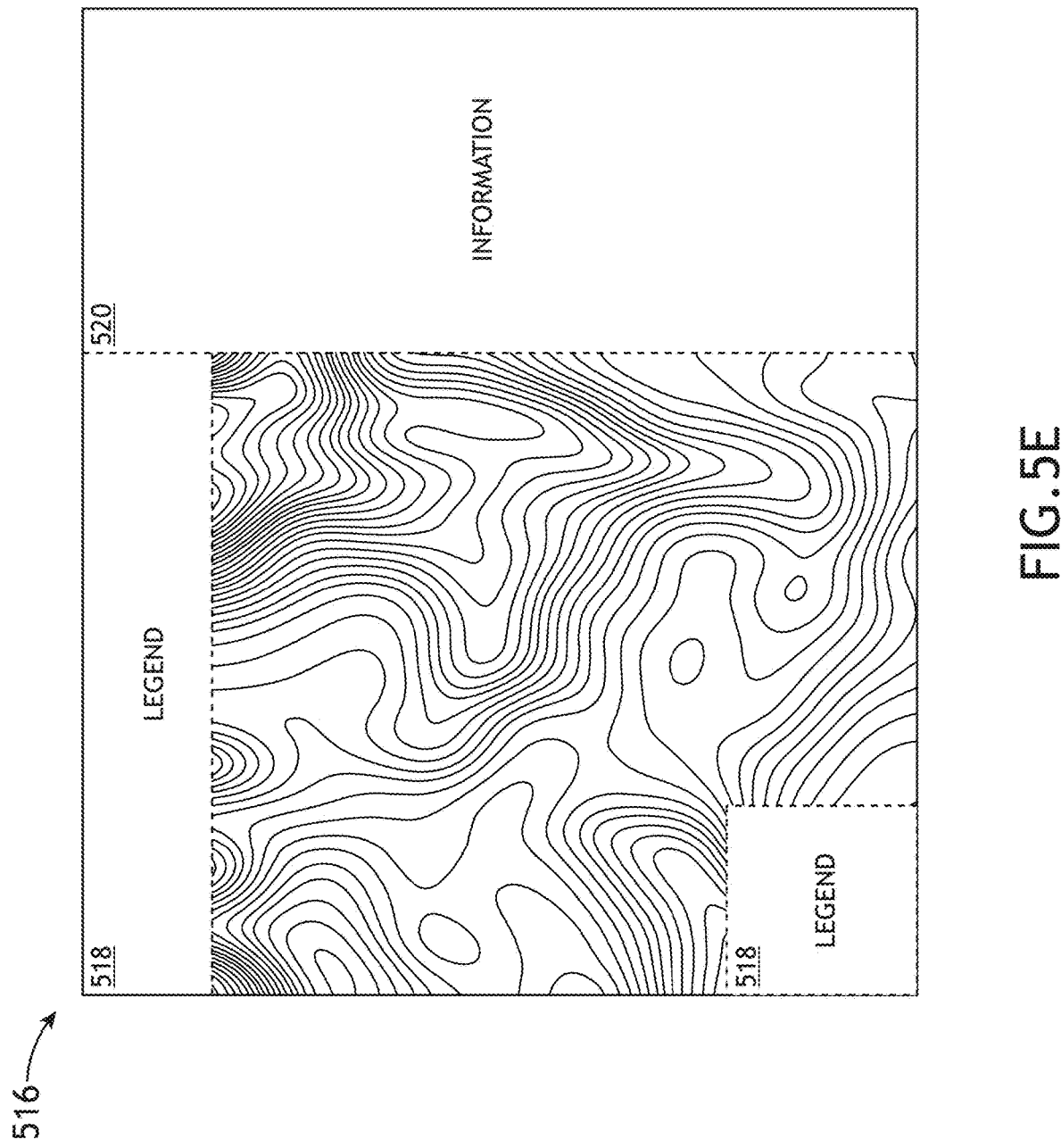

SENSOR ROD ASSEMBLY FOR MEASURING ELEVATIONS

CROSS-REFERENCE TO RELATED APPLICATIONS

The present application is related to and claims benefit of the earliest available effective filing date from the following applications: The present application constitutes a continuation-in-part application of U.S. patent application entitled SENSOR ROD ASSEMBLY FOR MEASURING ELEVATIONS, filed Jun. 19, 2017, application Ser. No. 15/627,340; which is a regular (non-provisional) patent application of U.S. Provisional Patent Application entitled SYSTEM AND METHOD FOR MEASURING WITH AN ELEVATION ROD, filed Jun. 17, 2016, Application No. 62/351,676; which are each incorporated herein by reference in the entirety.

TECHNICAL FIELD

The present invention generally relates to measuring elevation grades, and, in particular, is directed to an electronic elevation rod for measuring elevations with a laser level.

BACKGROUND

In the construction and surveying industries, measuring elevation is a necessity to ensure a project is completed correctly both when starting new construction projects and when building additions onto a previously-constructed project. Systems for measuring elevation grades with a laser level currently known in the art require a number of components and steps. One component is the static tripod. Another component is the laser, generally attached to the tripod. Lasers are first set up at a general height within certain limits of the desired elevation. Then the laser is set to a value within an elevation range, based on sight approximation. The range of elevation is defined as between the laser elevation and the desired elevation, but not a specific value. A third component is the elevation rod, often with an attached laser reader to complement the laser. Once the laser reader registers the emitted laser beam, the value on the measuring stick may be added to or subtracted from the laser height elevation to find the desired elevation. Aside from the attached laser reader, elevations rods typically are not equipped with electronics.

As determining multiple elevations for a project site may be complicated, the equipment currently known in the art requires skilled, qualified users who have years of experience and know-how to accurately calculate elevations on a project site. In addition, measuring elevation grades with equipment currently known in the art can be costly, with the needing to move multiple components increasing both time spent on surveying and the possibility of error in the elevation calculation. As such, it would be desirable to provide a system and method for measuring elevations that overcomes the defects described above.

SUMMARY

A sensor rod assembly is disclosed, in accordance with one or more embodiments of the present disclosure. In one embodiment, the sensor rod assembly includes a master stick. In another embodiment, the sensor rod assembly includes an extension stick. In another embodiment, the master stick and the at least one extension stick are couplable together via at least one of a physical coupling, an electrical coupling, or a communicative coupling. In another embodiment, the sensor rod assembly includes a controller. In another embodiment, the controller includes one or more processors. In another embodiment, the one or more processors are communicatively coupled to at least one set of detection circuitry and a user interface device. In another embodiment, the one or more processors are configured to execute a set of program instructions configured to cause the one or more processors to receive one or more detection signals from at least one of the master stick or the extension stick. In another embodiment, the one or more processors are configured to execute a set of program instructions configured to cause the one or more processors to determine an elevation of a laser light based on the received one or more detection signals.

A sensor rod assembly is disclosed, in accordance with one or more embodiments of the present disclosure. In one embodiment, the sensor rod assembly includes a master stick. In another embodiment, the master stick includes at least one sensor board. In another embodiment, the at least one sensor board includes at least one set of a plurality of sensor devices. In another embodiment, the master stick includes at least one set of detection circuitry. In another embodiment, at least one set of detection circuitry is coupled to the at least one set of the plurality of sensor devices. In another embodiment, the at least one set of detection circuitry is configured to receive an output of a particular sensor device of the at least one set of the plurality of sensor devices. In another embodiment, the output is generated following the particular sensor device of the at least one set of the plurality of sensor devices detecting laser light. In another embodiment, the sensor rod assembly includes a controller. In another embodiment, the controller includes one or more processors. In another embodiment, the one or more processors are communicatively coupled to the at least one set of detection circuitry and a user interface device. In another embodiment, the one or more processors are configured to execute a set of program instructions configured to cause the one or more processors to receive one or more detection signals from the at least one set of detection circuitry. In another embodiment, the one or more detection signals are based on the output of the particular sensor device of the at least one set of the plurality of sensor devices. In another embodiment, the one or more processors are configured to execute a set of program instructions configured to cause the one or more processors to determine an elevation of a laser light based on the received one or more detection signals from the at least one set of detection circuitry.

A sensor rod assembly is disclosed, in accordance with one or more embodiments of the present disclosure. In one embodiment, the sensor rod assembly includes a master stick. In another embodiment, the master stick includes at least one sensor board. In another embodiment, the at least one sensor board includes at least one set of a plurality of sensor devices. In another embodiment, the master stick includes at least one set of detection circuitry. In another embodiment, the at least one set of detection circuitry is coupled to the at least one set of the plurality of sensor devices. In another embodiment, the at least one set of detection circuitry is configured to receive an output of a particular sensor device of the at least one set of the plurality of sensor devices. In another embodiment, the output is generated following the particular sensor device of the at least one set of the plurality of sensor devices detecting laser light. In another embodiment, the sensor rod assembly includes a user interface device. In another embodiment, the sensor rod assembly includes a controller. In another embodiment, the controller includes one or more processors, wherein the one or more processors are communicatively coupled to the at least one set of detection circuitry and the user interface device. In another embodiment, the one or more processors are configured to execute a set of program instructions configured to cause the one or more processors to receive a benchmark elevation value input from the user interface device. In another embodiment, the one or more processors are configured to execute a set of program instructions configured to cause the one or more processors to receive, from the at least one set of detection circuitry, one or more detection signals generated by an incident laser beam when the sensor rod assembly is positioned at the benchmark elevation. In another embodiment, the one or more processors are configured to execute a set of program instructions configured to cause the one or more processors to receive a benchmark elevation calibration indication from the user interface device. In another embodiment, the one or more processors are configured to execute a set of program instructions configured to cause the one or more processors to store a parameter indicative of the elevation of the laser beam measured during the benchmark elevation calibration. In another embodiment, the one or more processors are configured to execute a set of program instructions configured to cause the one or more processors to receive a target elevation value input from the user interface device. In another embodiment, the one or more processors are configured to execute a set of program instructions configured to cause the one or more processors to calculate a target laser height based on the stored parameter indicative of the elevation of the laser beam during the benchmark elevation calibration and the inputted target elevation value. In another embodiment, the one or more processors are configured to execute a set of program instructions configured to cause the one or more processors to display, on the user interface device, one or more indicators for rod height adjustment of the sensor rod assembly to achieve the target elevation.

A sensor rod assembly is disclosed, in accordance with one or more embodiments of the present disclosure. In one embodiment, the sensor rod assembly includes a laser level. In another embodiment, the sensor rod assembly includes a user interface device. In another embodiment, the sensor rod assembly includes a master stick. In another embodiment, the master stick includes at least one sensor board. In another embodiment, the at least one sensor board includes at least one set of a plurality of sensor devices. In another embodiment, the master stick includes at least one set of detection circuitry. In another embodiment, the at least one set of detection circuitry is coupled to the at least one set of the plurality of sensor devices. In another embodiment, the at least one set of detection circuitry is configured to receive an output of a particular sensor device of the at least one set of the plurality of sensor devices. In another embodiment, the output is generated following the particular sensor device of the at least one set of the plurality of sensor devices detecting laser light from the laser level. In another embodiment, the sensor rod assembly includes a controller. In another embodiment, the controller includes one or more processors. In another embodiment, the one or more processors are communicatively coupled to the at least one set of detection circuitry and the user interface device. In another embodiment, the one or more processors are configured to execute a set of program instructions configured to cause the one or more processors to receive a benchmark elevation value input from the user interface device. In another embodiment, the one or more processors are configured to execute a set of program instructions configured to cause the one or more processors to receive, from the at least one set of detection circuitry, one or more detection signals generated by an incident laser beam when the master stick is positioned at the benchmark elevation. In another embodiment, the one or more processors are configured to execute a set of program instructions configured to cause the one or more processors to receive a benchmark elevation calibration indication from the user interface device. In another embodiment, the one or more processors are configured to execute a set of program instructions configured to cause the one or more processors to store a parameter indicative of the elevation of the laser beam measured during the benchmark elevation calibration. In another embodiment, the one or more processors are configured to execute a set of program instructions configured to cause the one or more processors to receive a target elevation value input from the user interface device. In another embodiment, the one or more processors are configured to execute a set of program instructions configured to cause the one or more processors to calculate a target laser height based on the stored parameter indicative of the elevation of the laser beam during the benchmark elevation calibration and the inputted target elevation value. In another embodiment, the one or more processors are configured to execute a set of program instructions configured to cause the one or more processors to display, on the user interface device, one or more indicators for rod height adjustment of the master stick to achieve the target elevation.

BRIEF DESCRIPTION OF THE DRAWINGS

The numerous advantages of the disclosure may be better understood by those skilled in the art by reference to the accompanying figures in which:

FIG. 3A illustrates a simplified block diagram of a sensor board for a rod assembly for measuring elevations, in accordance with one or more embodiments of the present disclosure;

FIG. 3B illustrates a simplified block diagram of a sensor board for a rod assembly for measuring elevations, in accordance with one or more embodiments of the present disclosure;

FIG. 3D illustrates a simplified block diagram of a sensor board for a rod assembly for measuring elevations, in accordance with one or more embodiments of the present disclosure;

FIG. 3E illustrates a simplified block diagram of a sensor board for a rod assembly for measuring elevations, in accordance with one or more embodiments of the present disclosure;

FIG. 5E illustrates a generated map of a project site surveyed with a sensor rod assembly, in accordance with one or more embodiments of the present disclosure;

DETAILED DESCRIPTION OF THE INVENTION

Figure 1A:
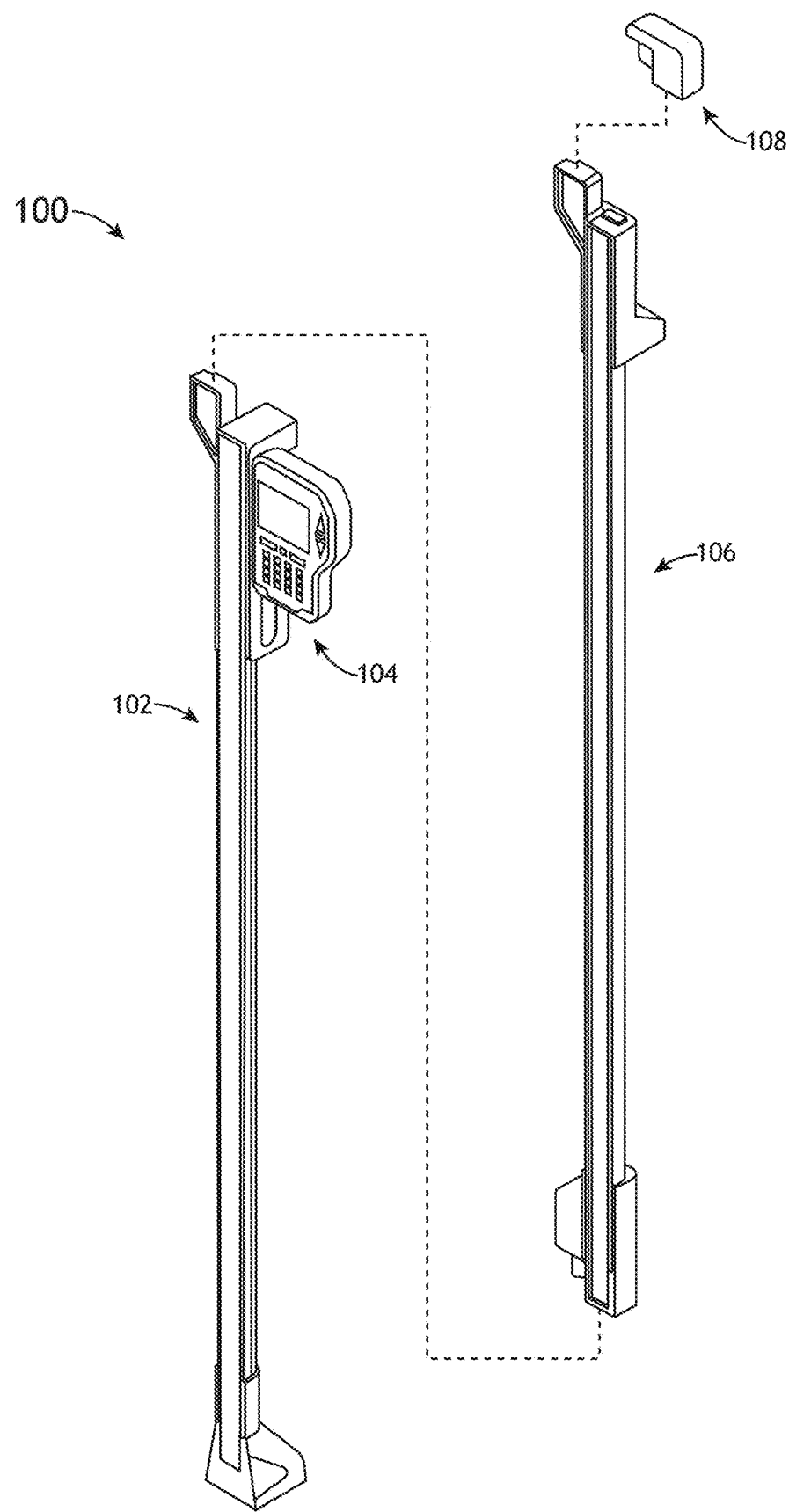
FIG. 1A illustrates a sensor rod assembly for measuring elevations, in accordance with one or more embodiments of the present disclosure.
Figure 1B:
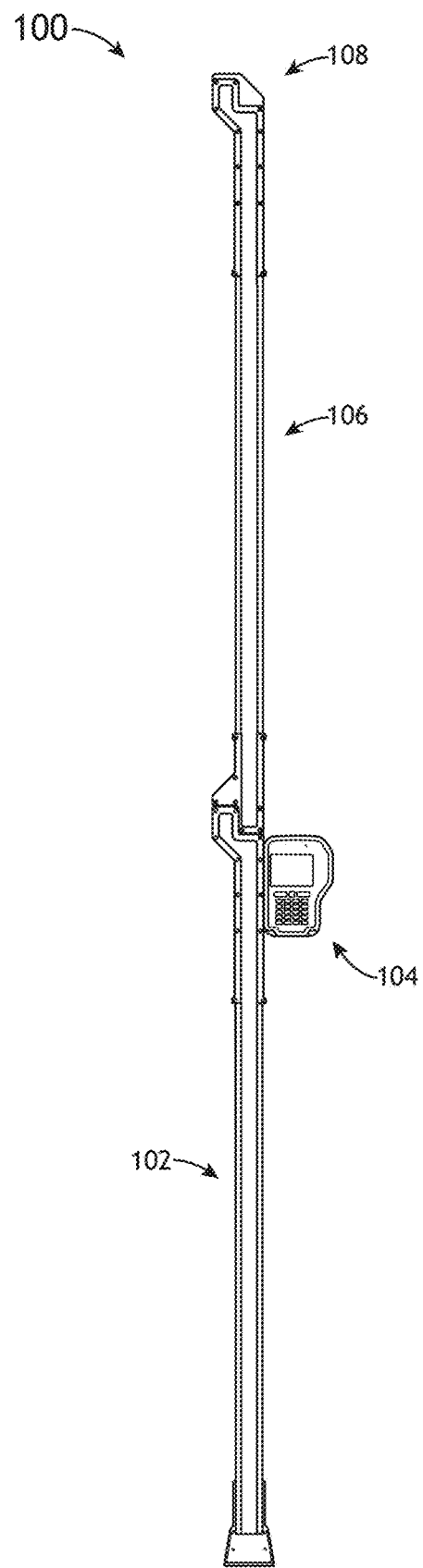
FIG. 1B illustrates a sensor rod assembly for measuring elevations, in accordance with one or more embodiments of the present disclosure.
Figure 1C:
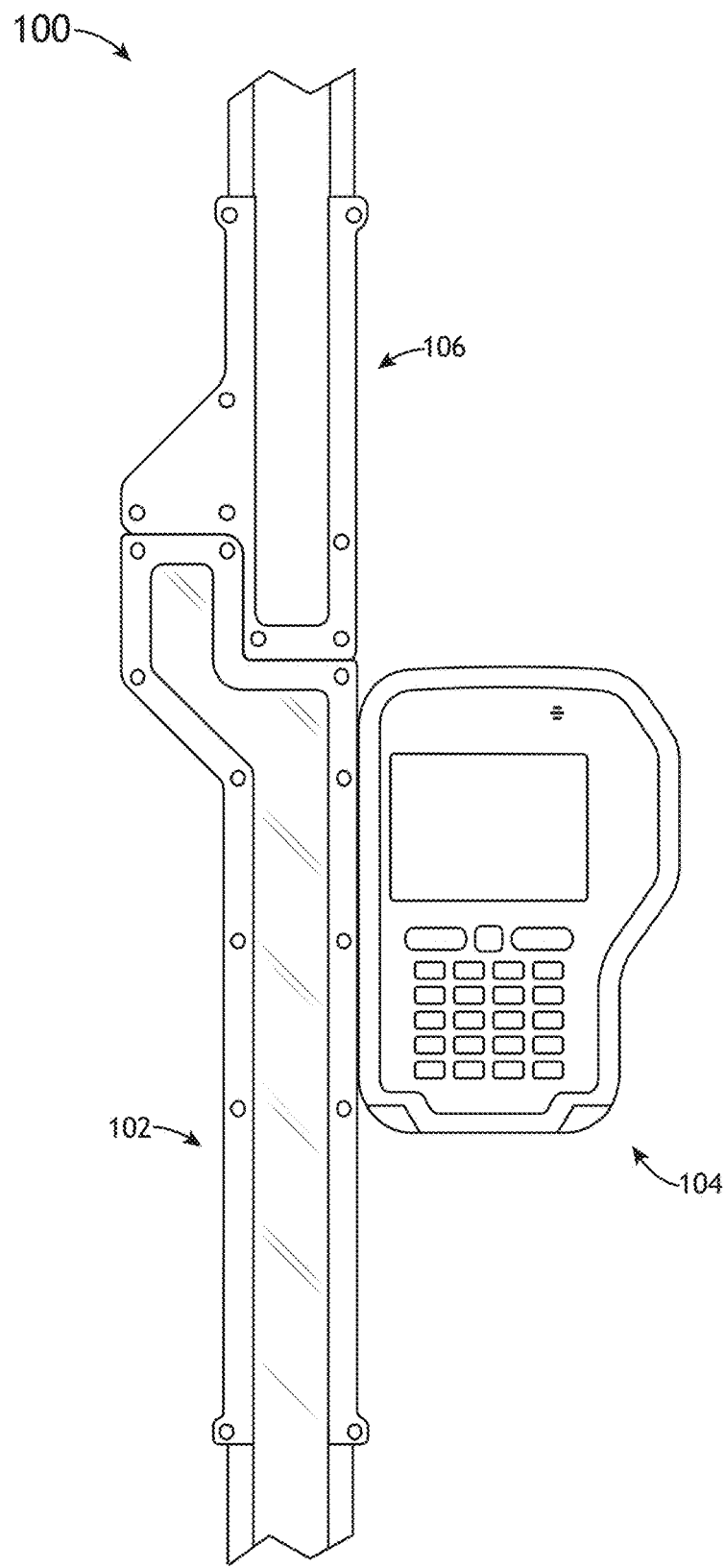
FIG. 1C illustrates a portion of a sensor rod assembly for measuring elevations, in accordance with one or more embodiments of the present disclosure.
Figure 1D:
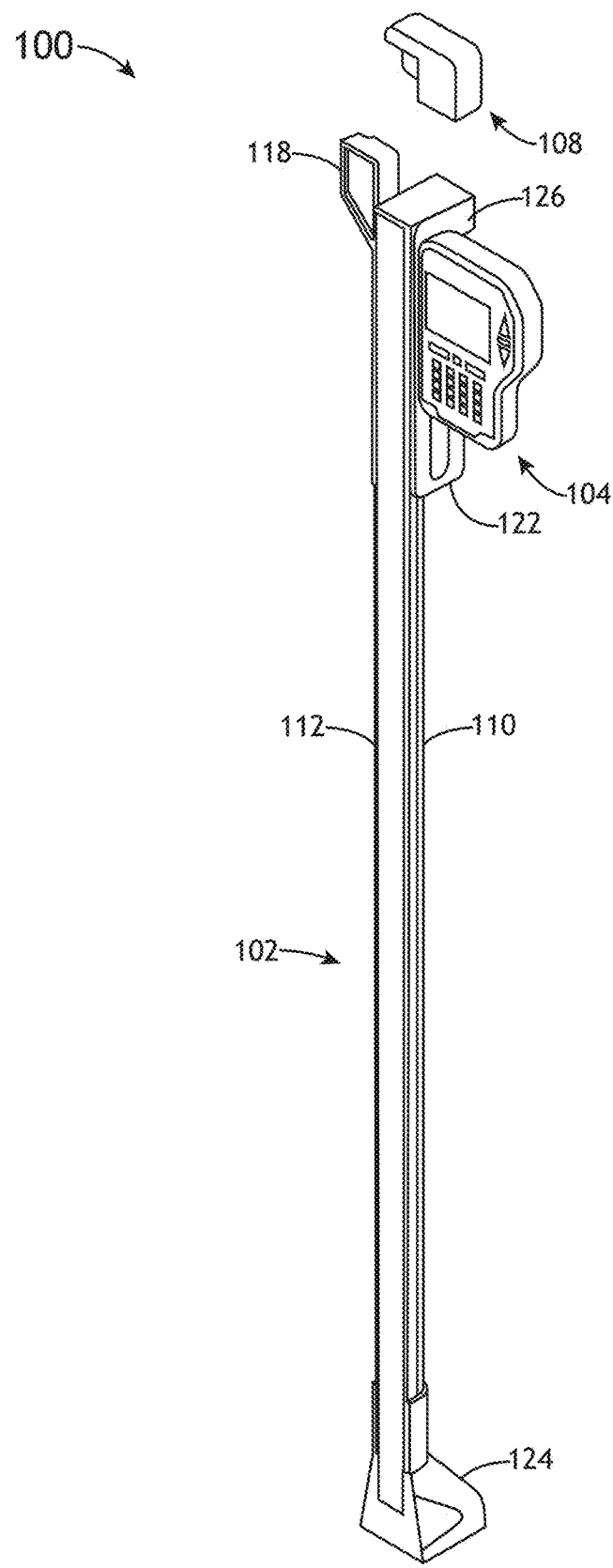
FIG. 1D illustrates a master stick of a sensor rod assembly for measuring elevations, in accordance with one or more embodiments of the present disclosure.
Figure 1E:
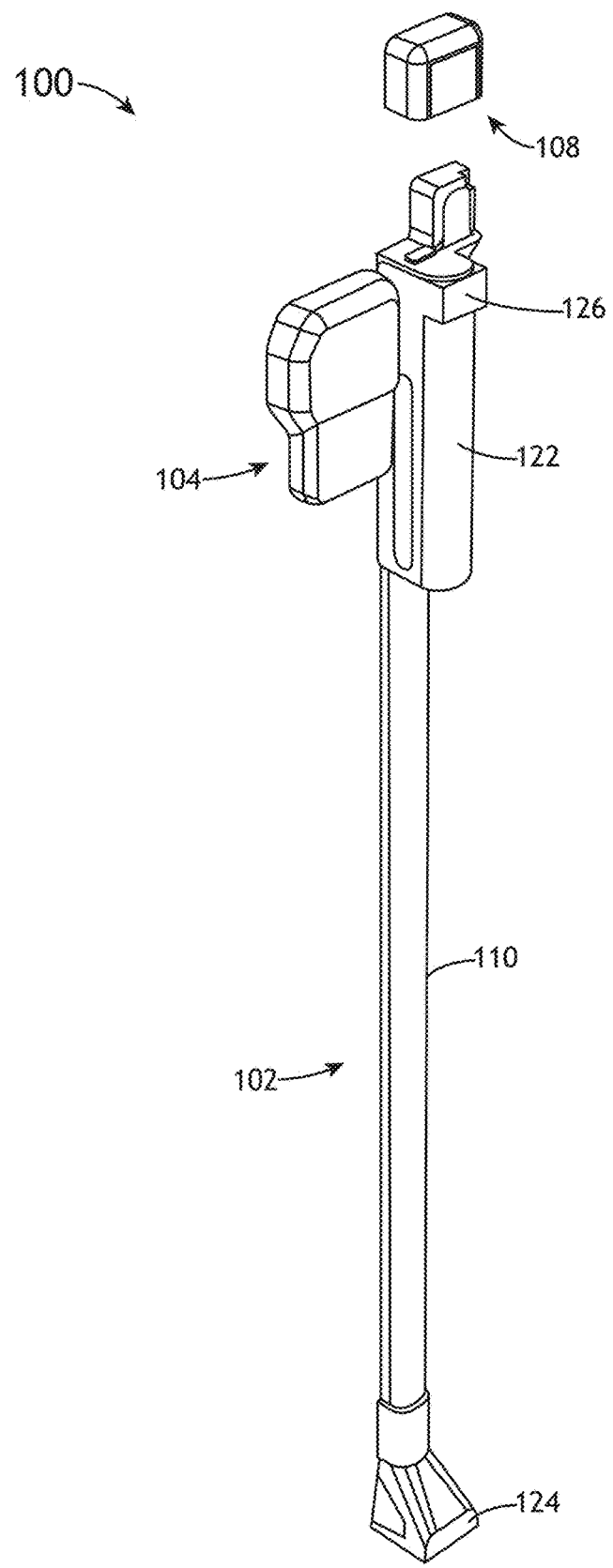
FIG. 1E illustrates a master stick of a sensor rod assembly for measuring elevations, in accordance with one or more embodiments of the present disclosure.
Figure 1F:
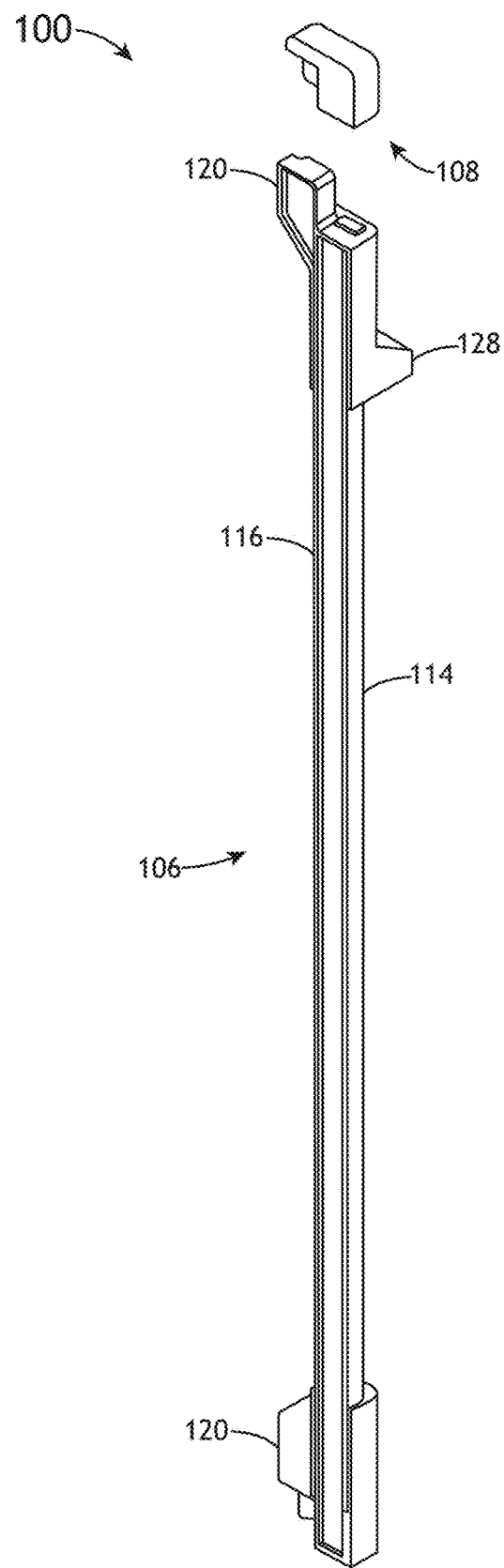
FIG. 1F illustrates an extension stick of a sensor rod assembly for measuring elevations, in accordance with one or more embodiments of the present disclosure.
Figure 1G:
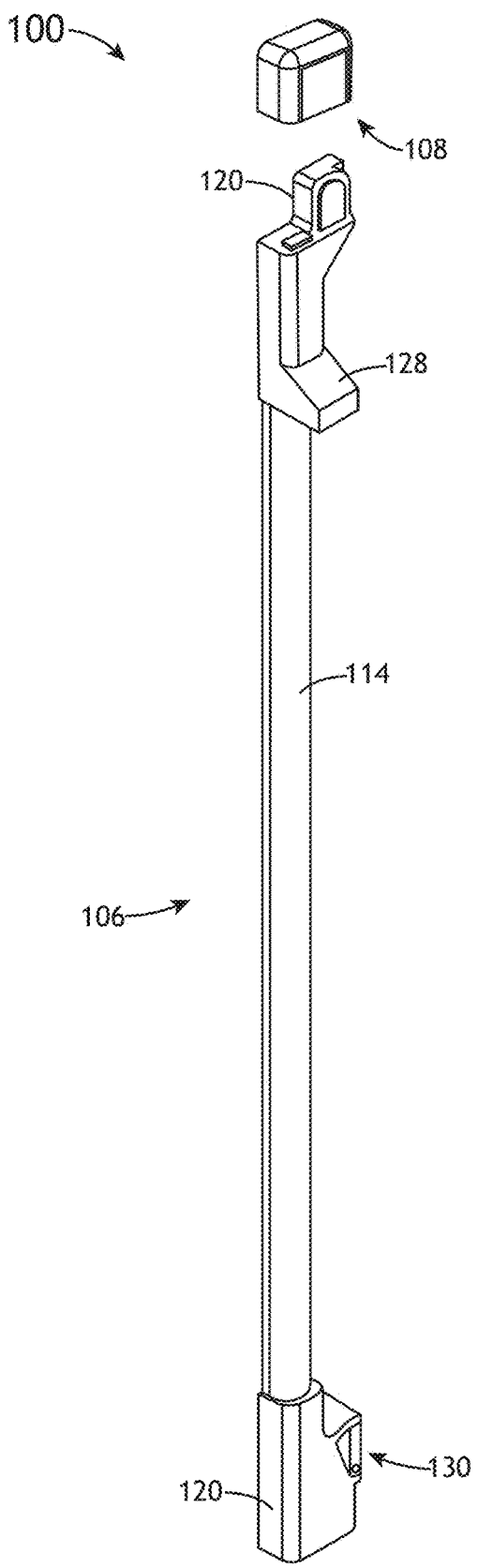
FIG. 1G illustrates an extension stick of a sensor rod assembly for measuring elevations, in accordance with one or more embodiments of the present disclosure.

Reference will now be made in detail to the subject matter disclosed, which is illustrated in the accompanying drawings.

FIGS. 1A through 10C generally illustrate a sensor rod assembly for measuring elevation grades, in accordance with one or more embodiments of the present disclosure.

Embodiments of the present disclosure are directed to a sensor rod assembly for detecting a laser beam from a corresponding laser level and automatically calculating instructions for a user. Such instructions may include required adjustments necessary to reach a target elevation, the amount a user must remove or add to the surface to reach the target elevation (i.e., the cut or fill amount), or instructions for forming graded or sloped surface.

FIGS. 1A-1G generally illustrate a sensor rod assembly 100, in accordance with one or more embodiments of the present disclosure.

In one embodiment, the sensor rod assembly 100 includes a master stick 102 (e.g., master rod 102, primary stick or rod 102, master or primary elevation stick or rod 102). In another embodiment, the sensor rod assembly 100 includes a controller 104. In another embodiment, the sensor rod assembly 100 includes one or more extension sticks 106 (e.g., extension rods 106, secondary sticks or rods 106, extension or secondary elevation sticks or rods 106).

The master stick 102 and the one or more extension sticks 106 may be couplable together (e.g., via at least one of a physical coupling, an electrical coupling, and/or a communicative coupling). For example, the master stick 102 and the one or more extension sticks 106 may be coupled together in order to achieve a particular height for the sensor rod assembly 100, such that the sensor road assembly 100 may be considered of a modular design. The master stick 102 and/or the one or more extension sticks 106 may include any rod or stick structure capable of securing the various components described throughout the present disclosure.

The controller 104 and the master stick 102 may be couplable together (e.g., via at least one of a physical coupling, an electrical coupling, and/or a communicative coupling). The controller 104 and an extension stick 106 of the one or more extension sticks 106 may be couplable together (e.g., via at least one of a physical coupling, an electrical coupling, and/or a communicative coupling).

In another embodiment, the sensor rod assembly 100 includes a cap 108. The cap 108 may be couplable to the master stick 102 and/or the one or more extension sticks 106.

In another embodiment, the master stick 102 includes a sensor board housing 110 with a faceplate 112. The controller 104 may be mechanically coupled to the housing 110. The controller 106 may be separated from the housing 110. The controller 106 may be reversibly attachable (e.g., removable and/or reattachable) to the housing 110.

In another embodiment, the one or more extension sticks 106 each include a sensor board housing 114 with a faceplate 116. The sensor board housing 110 and the sensor board housing 114 may contain one or more sensor boards or sensor arrays (e.g., sensor segments), which may include one or more sensor devices suitable for detecting laser light (e.g., one or more photodiodes) as described in detail further herein.

The faceplates 112, 116 may be fabricated from a material that selectively transmits a laser beam emitted from a laser level to the one or more sensor boards while blocking other light from other sources (e.g. sunlight, halogen light, fluorescent light, compact fluorescent light (CFL), LED light, or incandescent light). For example, the faceplates 112, 116 may be fabricated from a material including, but not limited to, a material configured to transmit only a laser of a red wavelength (e.g., a red laser) while blocking a laser of a green wavelength (e.g., a green laser) and other light from other sources, a material configured to transmit only a green laser while blocking a red laser and other light from other sources, or a material configured to transmit both red lasers and green lasers while blocking other light from other sources. In this regard, the material may act like a bandpass filter selected to pass the laser illumination, while blocking illumination of other wavelengths.

The master stick 102 may include an offset portion 118 of the sensor board housing 110. The offset portion 118 may include one or more sensor boards. The offset portion 118 may be configured to allow an extension stick 106 to couple to the master stick 102 while aligning the sensor boards installed within the sensor board housing 114 and the sensor board housing 110, respectively.

The extension stick 106 may include an offset portion 120 of the sensor board housing 114. The offset portion 120 may include one or more sensor boards. The offset portion 120 may be configured to allow a second extension stick 106 to couple to a first extension stick 106. In this regard, a particular height for the sensor rod assembly 100 may be achieved using multiple extension sticks 106 coupled to the master stick 102.

It is noted herein the offset portion 118 and the sensor board housing 110 of the master stick 102 may be fabricated separately (with the offset portion 118 subsequently coupled to the sensor board housing 110 of the master stick 102) or as a single unit. In addition, it is noted herein the offset portion 120 and the sensor board housing 114 may be fabricated separately (e.g., with the offset portion 120 subsequently coupled to the sensor board housing 114) or as a single fabricated unit.

In another embodiment, the master stick 102 includes a battery compartment 122. It is noted herein the battery compartment 122 and the sensor board housing 114 may be fabricated separately (e.g., with the battery compartment 122 subsequently coupled to the sensor board housing 114) or as a single fabricated unit.

In another embodiment, the master stick 102 may include one or more support structures. For example, the master stick 102 may include a primary foot 124 with a contact surface configured to support the sensor rod assembly 100 in an upright position and a contact surface configured to support the sensor rod assembly in the lie-down position. By way of another example, the master stick 102 may include a secondary foot 126 with a contact surface configured to support the sensor rod assembly 100 in a lie-down position.

In another embodiment, the one or more extension sticks 106 may include one or more support structures. For example, an extension stick 106 may include a foot 128 with a contact surface configured to support the sensor rod assembly 100 in a lie-down position.

In another embodiment, the sensor rod assembly 100 includes an interlocking assembly 130. The interlocking assembly 130 may include any interlocking assembly known in the art (e.g., a latching assembly, a tongue-and-groove assembly, a tab-and-slot assembly, a friction clip assembly, or the like). The interlocking assembly 130 may be spring-loaded so as to prevent the extension sticks 106 from self-detaching during use.

A component of the interlocking assembly 130 may be housed within the offset portion 118 of the master stick 102. One or more components of the interlocking assembly 130 may be housed within one or more offset portions 120 of the one or more extension sticks 106.

For example, an interlocking assembly 130 may include a component on one end of the master stick 102 and a corresponding component on a first end of the extension stick 106. By way of another example, an interlocking assembly 130 may include a component on a second end of the first extension stick 106 and a corresponding component on a first end of a second extension stick 106. In this regard, multiple extension sticks 106 may be coupled to the master stick 102 in order to achieve a particular height for the sensor rod assembly 100, such that the sensor rod assembly 100 may be considered of a modular design.

The cap 108 may include a component of any interlocking assembly known in the art (e.g., a latching assembly, a tongue-and-groove assembly, a tab-and-slot assembly, a friction clip assembly, or the like). For example, the component may engage with a component of the interlocking assembly 130 configured to couple the master stick 102 and an extension stick 106, or two extension sticks 106, together. The interlocking assembly may be spring-loaded so as to prevent the cap 108 from self-detaching during use.

Although embodiments of the present disclosure illustrate the sensor rod assembly 100 and/or components of the sensor rod assembly 102 (e.g., the master stick 102, the controller 104, the extension stick 106, or the like) in solid lines, it is noted herein select portions of the sensor rod assembly 100 and/or components of the sensor rod assembly 100 (e.g., portions of the master stick 102, the controller 104, the extension stick 106, or the like) may be illustrated in broken lines. For example, the select portions illustrated in broken lines may be understood as forming no part of the claimed invention or design of the sensor rod assembly 100 and/or components of the sensor rod assembly 100. By way of another example, the select portions illustrated in broken lines may be understood as representing only a portion of an environment in which the claimed invention or design of the sensor rod assembly 100 and/or components of the sensor rod assembly 100 operates. In this regard, the illustrations of the sensor rod assembly 100 and/or components of the sensor rod assembly 102 (e.g., the master stick 102, the controller 104, the extension stick 106, or the like) may be understood as providing support for solid lines forming part of the claimed invention or design, broken lines not forming part of the claimed invention or design, broken lines representing a portion of an environment in which the claimed invention or design operates, and/or a combination of solid lines and broken lines, for purposes of the present disclosure. Therefore, the above description should not be interpreted as a limitation on the scope of the present disclosure but merely an illustration.

Figure 2:
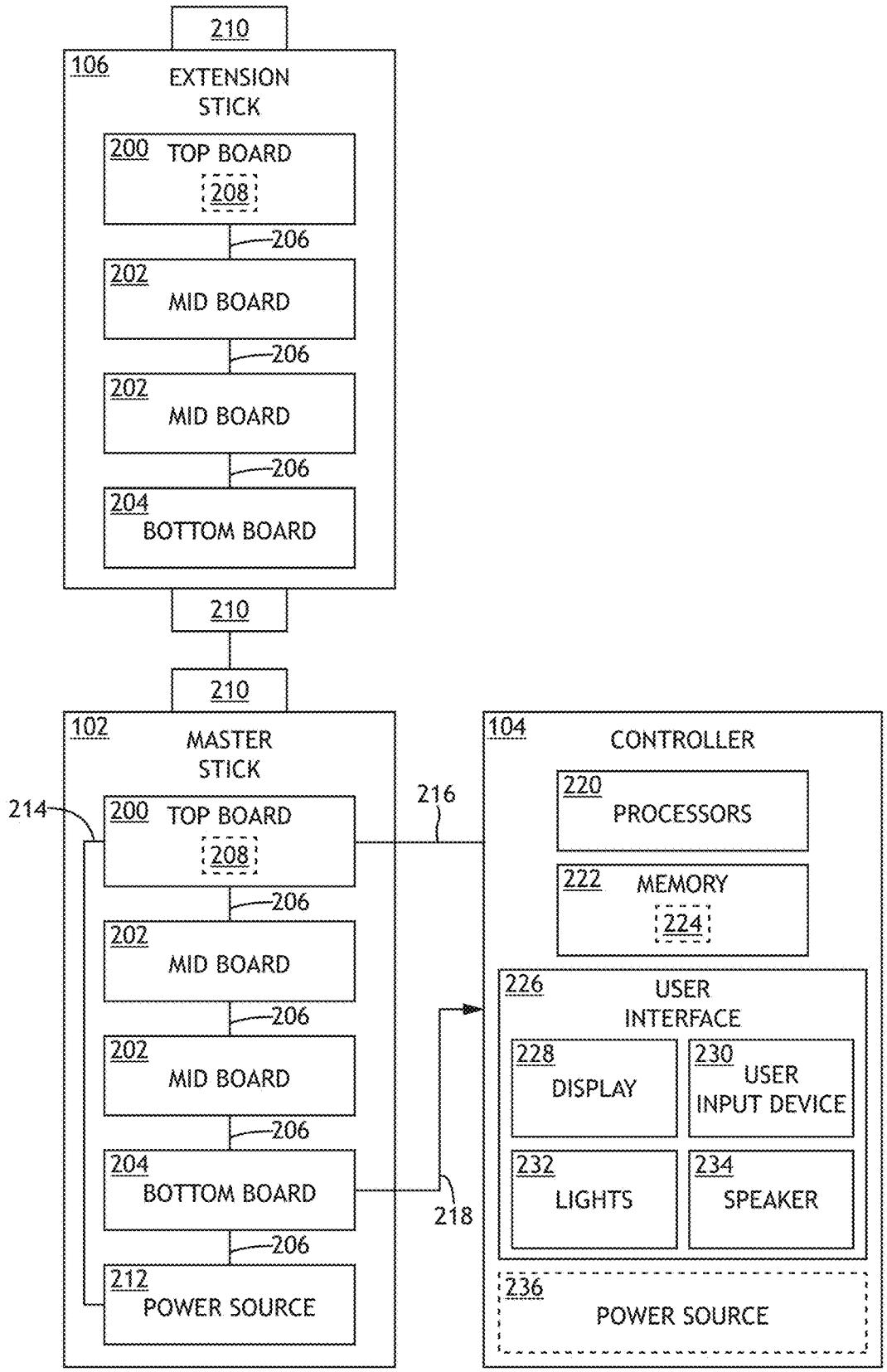
FIG. 2 illustrates a simplified block diagram of a sensor rod assembly for measuring elevations, in accordance with one or more embodiments of the present disclosure.

FIG. 2 illustrates a simplified block diagram view of the sensor rod assembly 100, in accordance with one or more embodiments of the present disclosure.

In one embodiment, the master stick 102 and/or the one or more extension sticks 106 includes a set of one or more sensor boards. A set of sensor boards may include a top sensor board 200 disposed on the master stick 102 and/or the one or more extension sticks 106. The set of sensor boards may include one or more middle sensor boards 202 (e.g., mid boards 202) disposed on the master stick 102 and/or the one or more extension sticks 106. For example, the set of sensor boards may include two middle sensor boards 202. The set of sensor boards may include a bottom sensor board 204 disposed on the master stick 102 and/or the one or more extension sticks 106. The sensors boards 200, 202, 204 may be connected via one or more sets of electrical circuitry 206. The top sensor board 200 may include an accelerometer 208.

In another embodiment, the master stick 102 and an extension stick 106 are coupled together via a set of electrical couplers 210. In another embodiment, where there are multiple extension sticks 106, a first extension stick 106 and a second extension stick 106 may be coupled together via a set of electrical couplers 210. The set of electrical couplers 210 may include, but are not limited to, a male connector/female connector assembly, a plug/receptacle assembly, or the like.

In another embodiment, the master stick 102 includes a power source 212. The power source 212 may be electrically connected to a sensor board of the set of sensor boards of the master stick 102. For example, the power source 212 may be electrically coupled to the top sensor board 200 via an electrical connection line 214.

FIGS. 3A-3E generally illustrate simplified block diagram views of the sensor boards 200, 202, 204 of the sensor rod assembly 100, in accordance with one or more embodiments of the present disclosure.

Referring now to FIG. 3A, in one embodiment the top sensor board 200 of the master stick 102 and/or the one or more extension sticks 106 includes a set of microcontroller units (MCUs) 300, where each MCU 300 may include an analog-to-digital convertor (ADC) 302, an input channel 304, and/or an output channel 306. In another embodiment, each MCU 300 is electrically connected to a set of one or more sensor devices 308 (e.g., photodiodes). For example, an ADC 302 of each MCU 300 may be electrically connected to the set of one or more sensor devices 308 (e.g., photodiodes) via a set of detection circuitry 310. For instance, the detection circuitry 310 may include, but is not limited to, an operational amplifier (e.g., a dual-stage operational amplifier, or the like).

In one example, the top sensor board 200 may include an MCU 300a with an ADC 302a, an input channel 304a, and an output channel 306a. The MCU 300a may be electrically connected to a set of one or more sensor devices 308a (e.g., photodiodes 308a) via a set of detection circuitry 310a. The MCU 300a may include a second input channel 312a electrically connected to the accelerometer 208.

Where the top sensor board 200 is installed within the master stick 102, the input channel 304a may be electrically connected to an electrical coupler 210 of the master stick 102 via one or more electrical circuitry 314, the electrical coupler 210 of the master stick 102 being configured to mate with an electrical coupler 210 of an extension stick 102.

Where the top sensor board 200 is installed within a first extension stick 106, the input channel 304a may be electrically connected to an electrical coupler 210 of the first extension stick 106 via one or more electrical circuitry 314, the electrical coupler 210 of the first extension stick 106 being configured to mate with an electrical coupler 210 of a second extension stick 106 via one or more electrical circuitry 314.

In another example, the top sensor board 200 may include an MCU 300b with an ADC 302b, an input channel 304b, and an output channel 306b. The ADC 302b may be electrically connected to a set of one or more sensor devices 308b (e.g., photodiodes 308b) via a set of detection circuitry 310b. The input channel 304b may be electrically connected to the output channel 306a of the MCU 300a via one or more electrical circuitry 206.

In another example, the top sensor board 200 may include an MCU 300c with an ADC 302c, an input channel 304c, and an output channel 306c. The ADC 302c may be electrically connected to a set of one or more sensor devices 308c (e.g., photodiodes 308c) via a set of detection circuitry 310c. The input channel 304c may be electrically connected to the output channel 306b of the MCU 300b via one or more electrical circuitry 206.

In another example, the top sensor board 200 may include an MCU 300d with an ADC 302d, an input channel 304d, and an output channel 306d. The ADC 302d may be electrically connected to a set of one or more sensor devices 308d (e.g., photodiodes 308d) via a set of detection circuitry 310d. The input channel 304d may be electrically connected to the output channel 306c of the MCU 300c via one or more electrical circuitry 206. The output channel 310d may be electrically connected to a middle sensor board 202 via one or more electrical circuitry 316.

Referring now to FIG. 3B, the master stick 102 may pass power from a power source (e.g., the power source 212) through a fuse block 318. The fuse block 318 may be electrically connected to a buck 320. For example, the buck 320 may operate at 3.3 V. The fuse block 318 may be electrically connected to an electrical coupler 210 of the master stick 102.

Figure 3C:
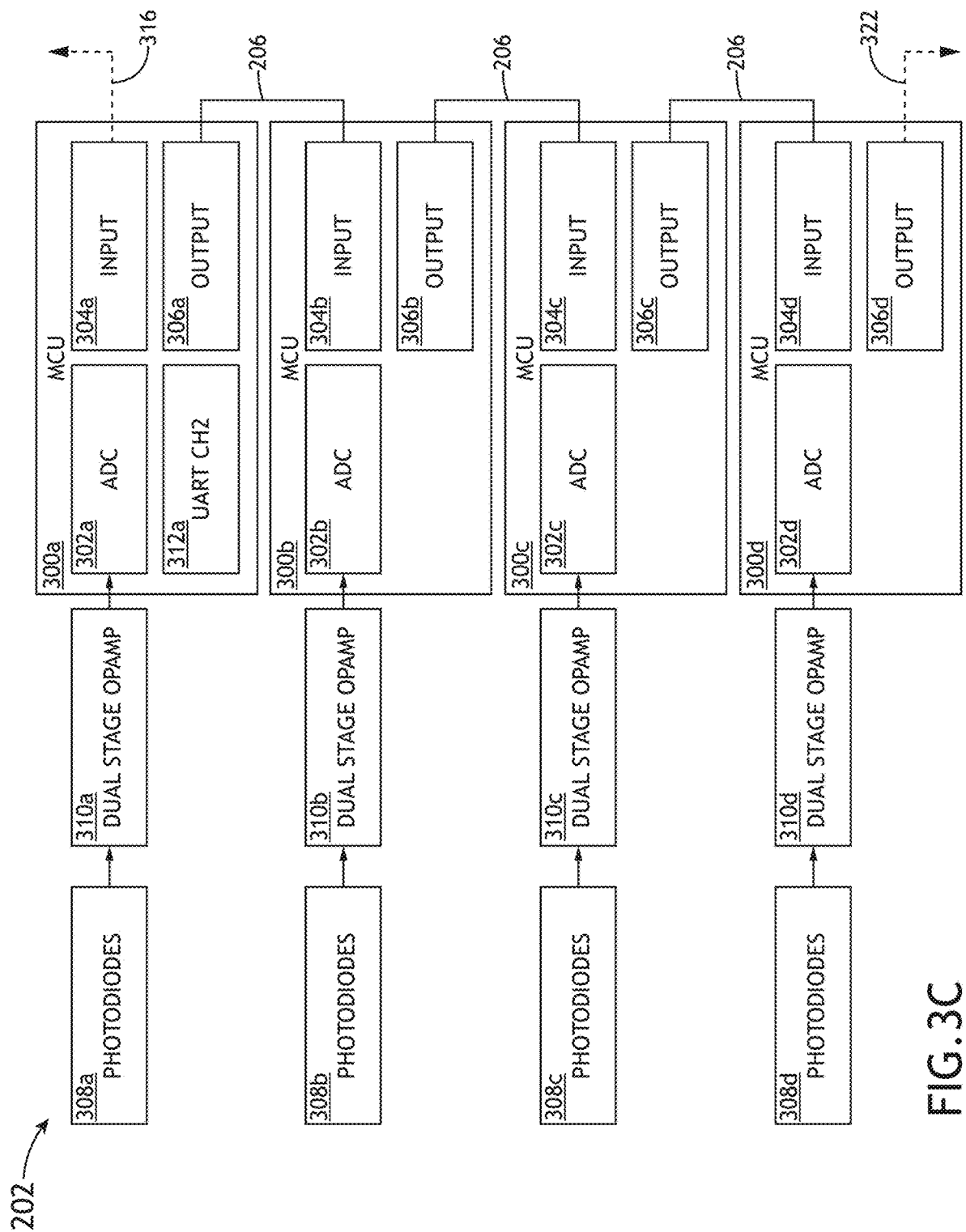
FIG. 3C illustrates a simplified block diagram of a sensor board for a rod assembly for measuring elevations, in accordance with one or more embodiments of the present disclosure.

Referring now to FIG. 3C, in one embodiment a middle sensor board 202 of the master stick 102 and/or the one or more extension sticks 106 includes a set of microcontroller units (MCUs) 300, where each MCU 300 may include an analog-to-digital convertor (ADC) 302, an input channel 304, and/or an output channel 306. In another embodiment, each MCU 300 is electrically connected to a set of one or more sensor devices 308 (e.g., photodiodes). For example, an ADC 302 of each MCU 300 may be electrically connected to the set of one or more sensor devices 308 (e.g., photodiodes) via a set of detection circuitry 310. For instance, the detection circuitry 310 may include, but is not limited to, an operational amplifier (e.g., a dual-stage operational amplifier, or the like).

In one example, the middle sensor board 202 may include an MCU 300a with an ADC 302a, an input channel 304a, and an output channel 306a. The MCU 300a may be electrically connected to a set of one or more sensor devices 308*a* (e.g., photodiodes 308*a*) via a set of detection circuitry 310*a*. The MCU 300*a* may include a second input channel 312*a*. The input channel 304*a* may be electrically connected to a top sensor board 200 (e.g., to the output channel 306*d* of the MCU 300*d* of the top sensor board 200, or another output channel of the top sensor board 200) via one or more electrical circuitry 316.

In another example, the middle sensor board 202 may include an MCU 300*b* with an ADC 302*b*, an input channel 304*b*, and an output channel 306*b*. The ADC 302*b* may be electrically connected to a set of one or more sensor devices 308*b* (e.g., photodiodes 308*b*) via a set of detection circuitry 310*b*. The input channel 304*b* may be electrically connected to the output channel 306*a* of the MCU 300*a* via one or more electrical circuitry 206.

In another example, the middle sensor board 202 may include an MCU 300*c* with an ADC 302*c*, an input channel 304*c*, and an output channel 306*c*. The ADC 302*c* may be electrically connected to a set of one or more sensor devices 308*c* (e.g., photodiodes 308*c*) via a set of detection circuitry 310*c*. The input channel 304*c* may be electrically connected to the output channel 306*b* of the MCU 300*b* via one or more electrical circuitry 206.

In another example, the middle sensor board 202 may include an MCU 300*d* with an ADC 302*d*, an input channel 304*d*, and an output channel 306*d*. The ADC 302*d* may be electrically connected to a set of one or more sensor devices 308*d* (e.g., photodiodes 308*d*) via a set of detection circuitry 310*d*. The input channel 304*d* may be electrically connected to the output channel 306*c* of the MCU 300*c* via one or more electrical circuitry 206.

Where the middle sensor board 202 is a first middle sensor board 202 of the master stick 102 and/or of a particular extension stick 106, the output channel 310*d* of the MCU 300*d* of the first middle sensor board 202 may be electrically connected to a second middle sensor board 202 (e.g., to the input channel 304*a* of the MCU 300*a* of the second middle sensor board 202, or another input channel) via one or more electrical circuitry 322.

Where the middle sensor board 202 is the last (e.g., lowest in stack order) middle sensor board 202 of the master stick 102 and/or of a particular extension stick 106, the output channel 310*d* of the MCU 300*d* of the last middle sensor board 202 may be electrically connected to a bottom sensor board 204 via one or more electrical circuitry 322. It is noted herein that the "last" middle sensor board 202 and the "second" middle sensor board 202 may be the same, where the master stick 102 and/or the one or more extension sticks 106 include two middle sensor boards 202.

Referring now to FIG. 3D, in one embodiment a bottom sensor board 204 of the master stick 102 and/or the one or more extension sticks 106 includes a set of microcontroller units (MCUs) 300, where each MCU 300 may include an analog-to-digital convertor (ADC) 302, an input channel 304, and/or an output channel 306. In another embodiment, each MCU 300 is electrically connected to a set of one or more sensor devices 308 (e.g., photodiodes). For example, an ADC 302 of each MCU 300 may be electrically connected to the set of one or more sensor devices 308 (e.g., photodiodes) via a set of detection circuitry 310. For instance, the detection circuitry 310 may include, but is not limited to, a dual-stage operational amplifier.

In one example, the bottom sensor board 204 may include an MCU 300*a* with an ADC 302*a*, an input channel 304*a*, and an output channel 306*a*. The MCU 300*a* may be electrically connected to a set of one or more sensor devices 308*a* (e.g., photodiodes 308*a*) via a set of detection circuitry 310*a*. The MCU 300*a* may include a second input channel 312*a*. The input channel 304*a* may be electrically connected to a middle sensor board 202 (e.g., to the output channel 306*d* of the MCU 300*d* of the middle sensor board 202, or another output channel of the middle sensor board 202) via one or more electrical circuitry 322.

In another example, the bottom sensor board 204 may include an MCU 300*b* with an ADC 302*b*, an input channel 304*b*, and an output channel 306*b*. The ADC 302*b* may be electrically connected to a set of one or more sensor devices 308*b* (e.g., photodiodes 308*b*) via a set of detection circuitry 310*b*. The input channel 304*b* may be electrically connected to the output channel 306*a* of the MCU 300*a* via one or more electrical circuitry 206.

Where the bottom sensor board 204 is installed within a first extension stick 106, the output channel 306*b* may be electrically connected to an electrical coupler 210 of the first extension stick 106 via one or more electrical circuitry 324, the electrical coupler 210 of the first extension stick 106 being configured to mate with an electrical coupler 210 of the master stick 102.

Where the bottom sensor board 204 is installed within a second extension stick 106, the output channel 306*b* may be electrically connected to an electrical coupler 210 of the second extension stick 106 via one or more electrical circuitry 324, the electrical coupler 210 of the second extension stick 106 being configured to mate with an electrical coupler 210 of the first extension stick 106.

Referring now to FIG. 3E, a particular extension stick 106 may pass power from a power source through a fuse block 318. The fuse block 318 may be electrically connected to a buck 320. For example, the buck 320 may operate at 3.3 V. The fuse block 318 may be electrically connected to an electrical coupler 210 of the particular extension stick 106.

Although embodiments of the present disclosure are directed to the sensor devices 308*a* 308*b*, 308*c*, 308*d* being photodiodes, the above description with respect to a particular type of sensor device should not be interpreted as a limitation on the scope of the present disclosure but merely an illustration.

Referring back to FIG. 2, in another embodiment the master stick 102 is in electrical communication with the controller 104 via one or more sets of electrical circuitry 216, 218. For example, the controller 104 may receive detection signals from the sets of detection circuitry 310 on the sensor boards 200, 202, 204 of the master stick 102 and/or the one or more extension sticks 106.

It is noted herein, however, that the one or more extension sticks 106 may be in electrical communication with the controller 104 via a set of electrical circuitry 216, 218. Therefore, the above description should not be interpreted as a limitation on the scope of the present disclosure but merely an illustration.

It is noted herein that the electrical circuitry 206, 216, 218 may include, but are not limited to, a power line (e.g., a 3.3 Volt (V) line), a data transmission line, a data receipt line, a hybrid data transmission line/data receipt line, a control line, or the like.

In another embodiment, the controller 104 includes one or more processors 220. The one or more processors 220 may be communicatively coupled to memory 222. The memory 222 may be configured to store one or more sets of program instructions 224. The one or more processors 220 may be configured to execute a set of program instructions 224 stored in memory 222 configured to perform one or more of the various steps described throughout the present disclosure.

In another embodiment, the controller 104 includes a user interface device 226 (or a user interface 226) for providing indicators of measurement results or processing results to a user and/or receiving instructions from the user. It is noted herein "user interface device" and "user interface" may be considered equivalent for purposes of the present disclosure.

The user interface device 226 may include, but is not limited to, a display device 228, one or more user input devices 230, one or more lights 232, or a speaker 234. It is noted herein that components of the user interface device 226 may serve multiple function (e.g., a user input device 230 is a button including built-in or underlaid lights 232, the display device 228 is a touchscreen capable of receiving user inputs, or the like).

The user interface device 226 may be housed in a common controller housing with the controller 104 (e.g., the one or more processors 220 and memory 222) such that the user interface device 226 and the controller 104 form an integrated unit. It is noted herein, however, that the user interface device 226 may be housed in a separate housing from the one or more processors 220 and/or memory 222. For example, the user interface device 226 may be included in a mobile device, wherein the one or more processors of the controller are communicatively coupled to the mobile device via a wireless connection. Therefore, the above description should not be interpreted as a limitation on the scope of the present disclosure but merely an illustration.

The controller 104 may include a power source 236. The power source 236 may include power management circuitry. The power management circuitry may be controlled by the one or more processors 220 to control the level of electrical power delivered to one or more components of the sensor rod assembly 100. For example, the power management circuitry may be used to control electrical power delivery to the sensor boards 200, 202, 204 any other components that may require power management. The power source 236 may be in line with or standalone from the power source 212 of the master stick 102 (and/or a power supply of the one or more extension sticks 106).

It is noted herein the power supply 212 and/or the power source 236 may include one or more batteries. For example, the one or more batteries may include, but are not limited to, one or more disposable or rechargeable batteries housed within a battery canister or sleeve, a built-in rechargeable battery pack, or the like. In addition, it is noted herein the power source 212 and/or the power source 236 may include one or more mechanisms for charging the one or more batteries. For example, the power source may include, but is not limited to, one or more electrical charging ports (e.g., AC port) or photovoltaic panels for charging the one or more batteries. Further, it is noted herein the power source 212 and/or the power source 236 may include one or more wired connections (e.g., power cords).

Although embodiments of the disclosure illustrate examples of sensor boards 200, 202, 204 of the sensor rod assembly 100, it is noted herein additional examples of sensor board circuitry usable within the sensor rod assembly 100 may be found in U.S. Pat. No. 7,019,278, issued Mar. 28, 2006, titled LASER RECEIVER USING MULTIPLE ARRAYS OF PHOTODETECTOR ELEMENTS; and U.S. Pat. No. 7,030,361, issued Apr. 18, 2006, titled RECEIVER CIRCUIT WITH "M" SECTORS EACH WITH "N" CHANNELS, which are each incorporated herein in the entirety.

FIGS. 4A-4F generally illustrate simplified block diagram views of the sensor rod assembly 100, in accordance with one or more embodiments of the present disclosure. It is noted that "sensor rod," "elevation stick", "elevation rod", "grade stick," "grade rod," and "measuring stick" are used interchangeably for the purposes of the present disclosure.

In one embodiment, the sensor rod assembly 100 includes a sensor rod 402. The sensor rod 402 may include any rod structure capable of securing the various components described throughout the present disclosure. It is noted herein that any of the various embodiments and components described in the context of the sensor rod 402 should be interpreted to extend to the embodiments of the master stick 102 and/or the one or more extension sticks 106 (and vice-versa) unless otherwise noted.

Figure 4A:
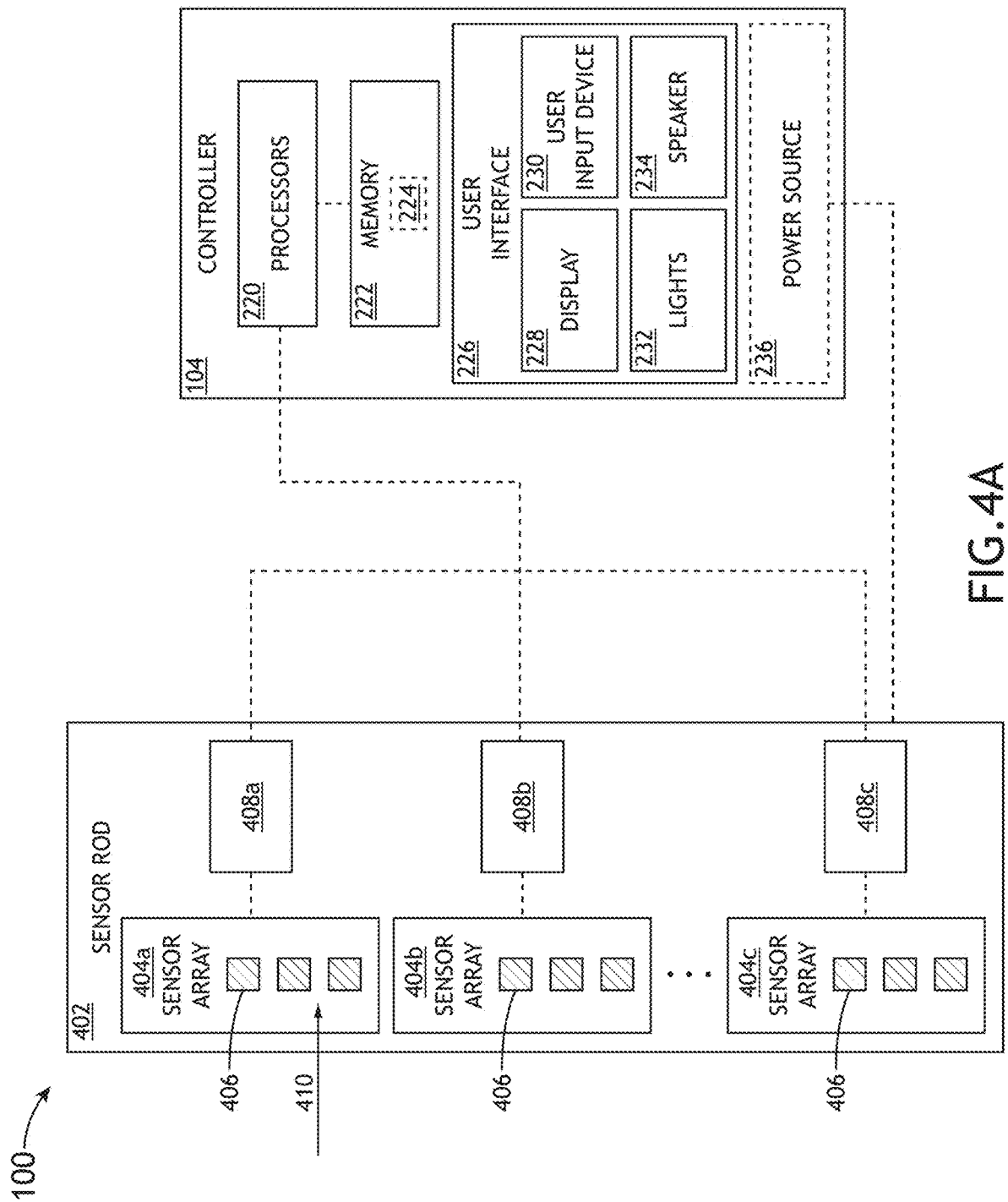
FIG. 4A illustrates a simplified block diagram of a sensor rod assembly for measuring elevations, in accordance with one or more embodiments of the present disclosure.

In one embodiment, the sensor rod 402 includes a set of sensor arrays 404 (e.g., sensor segments 404). Generally, the sensor rod 402 may include 1, 2, and up to an N number of sensor arrays 404. For example, as illustrated in FIG. 4A, the sensor rod 402 may include a set of sensor arrays 404a-404c. It is noted herein that any of the various embodiments and components described in the context of the sensor arrays 404a-404c should be interpreted to extend to the embodiments of the sensor boards 200, 202, 204 (and vice-versa) unless otherwise noted One or more of the sensor arrays 404a-404c may include a set of sensor devices 406 suitable for detecting laser light (e.g., one or more photodiodes). Generally, a sensor array may include 1, 2, and up to an N number of sensor devices 406. In one embodiment, the sensor devices 406 are disposed on the sensor rod 402. It is noted herein that any of the various embodiments and components described in the context of the sensor devices 406 should be interpreted to extend to the embodiments of the sensor devices 308a-308d (and vice-versa) unless otherwise noted.

In another embodiment, the sensor rod 402 includes detection circuitry 408 communicatively coupled to the sensor devices 406. Generally, the sensor rod 402 may include 1, 2, and up to an N number of detection circuitry 408. For example, as illustrated in FIG. 4A, the sensor rod 402 may include detection circuitry 408a-408c distributed across the different sensor arrays 404a-404c of the sensor rod 402 (e.g., detection circuitry 408a for sensor array 404a, detection circuitry 408b for sensor array 404b, detection circuitry 408c for sensor array 404c). It is noted that, for purposes of simplicity, FIG. 4A only depicts connection lines between the detection circuitry portions 408a-408c and the sensor arrays 404a-404c. As will be discussed in additional detail further herein, such a configuration is a not a limitation on the scope of the present disclosure and it is contemplated herein that each sensor device 406 may have a corresponding detection circuit. In addition, it is noted herein that any of the various embodiments and components described in the context of the detection circuitry 408 should be interpreted to extend to the embodiments of the detection circuitry 310a-310d (and vice-versa) unless otherwise noted.

In another embodiment, the sensor rod assembly 100 includes the controller 104. In another embodiment, the one or more processors 220 of the controller 104 are communicatively coupled to the detection circuitry 408a-408c such that the one or more processors 220 receive one or more detection signals from the sensor devices 406 of the various sensor arrays 404a-404c via the detection circuitry 408a-408c. In another embodiment, the one or more processors 220 are configured to determine a position of a laser beam 410 incident on the sensor rod 402 based on the received one or more detection signals from the detection circuitry 408a-408c.

In another embodiment, the one or more processors 220 receive a benchmark elevation value input from the user interface device 226 (e.g., from the user input device 230). In another embodiment, the one or more processors 220 receive, from the detection circuitry 408a-408c, one or more detection signals generated by an incident laser beam 410 when the sensor rod assembly 100 is positioned at the benchmark elevation. In another embodiment, the one or more processors 220 receive a benchmark elevation calibration indication from the user interface device 226 (e.g., from the user input device 230). In another embodiment, the one or more processors 220 store a parameter indicative of at least one of the height or elevation of the laser beam 410 measured during the benchmark elevation calibration. In another embodiment, the one or more processors 220 receive a target elevation value input from the user interface device 226 (e.g., the user input device 230). In another embodiment, the one or more processors 220 calculate a target laser height based on the stored parameter indicative of at least one of the height or elevation of the laser beam during the benchmark elevation calibration and the inputted target elevation value. In another embodiment, the one or more processors 220 display on the user interface device 226 (e.g., on the display device 228) one or more indicators for rod height adjustment of the sensor rod 402 to achieve the target elevation. In one embodiment, the user interface device 226 may display on the user interface device 226 (e.g., on the display device 228) a numerical value for which a user must adjust the height of the sensor rod 402 to achieve the target elevation. In another embodiment, the user interface device 226 may display on the user interface device 226 (e.g., on the display device 228) a graphical indicator (e.g., up/down arrow) measured from the current laser height for which a user must adjust the height of the sensor rod 402 to achieve the target elevation. In another embodiment, the user interface device 226 may display on the user interface device 226 (e.g., on the display device 228) a cut/fill amount (i.e., the difference between the current elevation and the target elevation) to indicate to the user how much ground or surface must be cut (i.e., removed) or filled (i.e., added) to achieve the target elevation.

In one embodiment, as illustrated in FIG. 4A, the controller 104 may be mechanically coupled to the sensor rod 402 in an integrated sensor rod/controller device. For example, the controller 104 may be separated from the sensor rod 402, with the user interface device 226 being housed within the dedicated controller 104. By way of another example, the controller 104 may be reversibly attachable to the sensor rod 402 (e.g., attachable one or more clips, fasteners, adhesives, snaps, slots, hook/loop connectors, magnets and etc.) via any wireless and/or wireline means known in the art.

Figure 4B:
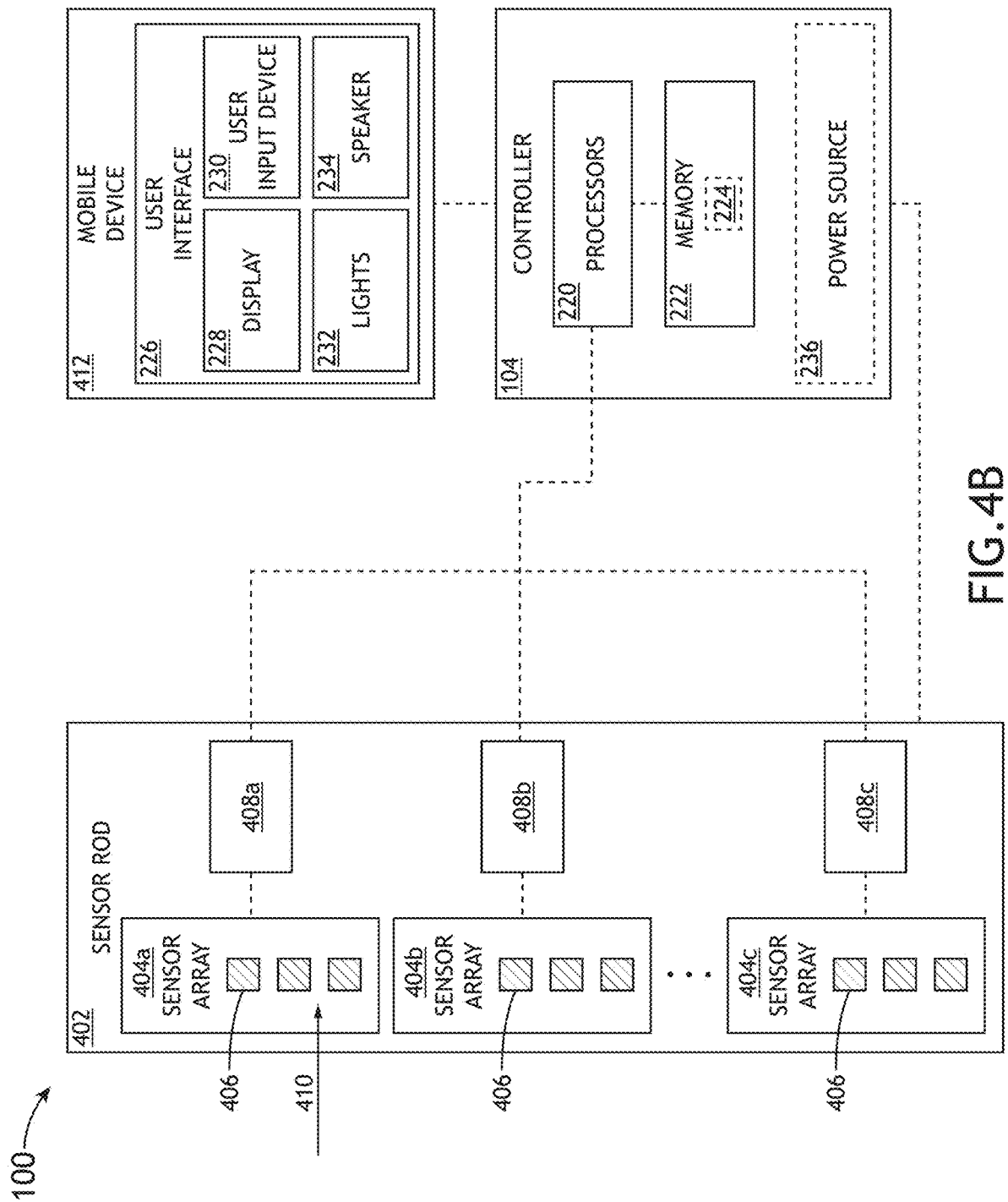
FIG. 4B illustrates a simplified block diagram of a sensor rod assembly for measuring elevations, in accordance with one or more embodiments of the present disclosure.

In one embodiment, as illustrated in FIG. 4B, the user interface device 226 is embodied in a mobile device 412. In this embodiment, the one or more processors 220 of the controller 104 are communicatively coupled to the mobile device 412 via communication circuitry 414. The user may receive and/or input information through the user interface device 226 (e.g., touchscreen, buttons, etc.) of the mobile device 412 (e.g., smartphone, tablet, personal digital assistant (PDA), etc.). In this regard, the mobile device 412 may be paired to the controller 104 associated with a given sensor rod assembly 100. The communicative coupling between the controller 104 and the mobile device 412 may be established via the communication circuitry 414 by any wireless and/or wireline means known in the art. For purposes of simplicity, corresponding communication circuitry has not been depicted within the mobile device 412 in FIG. 4B. It is noted herein and should be recognized by those skilled in the art that the mobile device 412 may include communication circuitry for interfacing with the communication circuitry 414 of the controller 104 and allowing a wireless pairing between the controller 104 and the mobile device 412.

The communication circuitry 414 of the controller 104 and the communication circuitry of the mobile device 412 may include circuitry suitable for establishing a local or short-range wireless connection between the controller 104 and the mobile device 412. In this embodiment, the communication circuitry 414 may include circuitry for establishing a radio-frequency link (e.g., BLUE TOOTH, LOW ENERGY BLUE TOOTH, near field communication (NFC) and etc.) between the controller 104 and the mobile device 412.

Figure 4C:
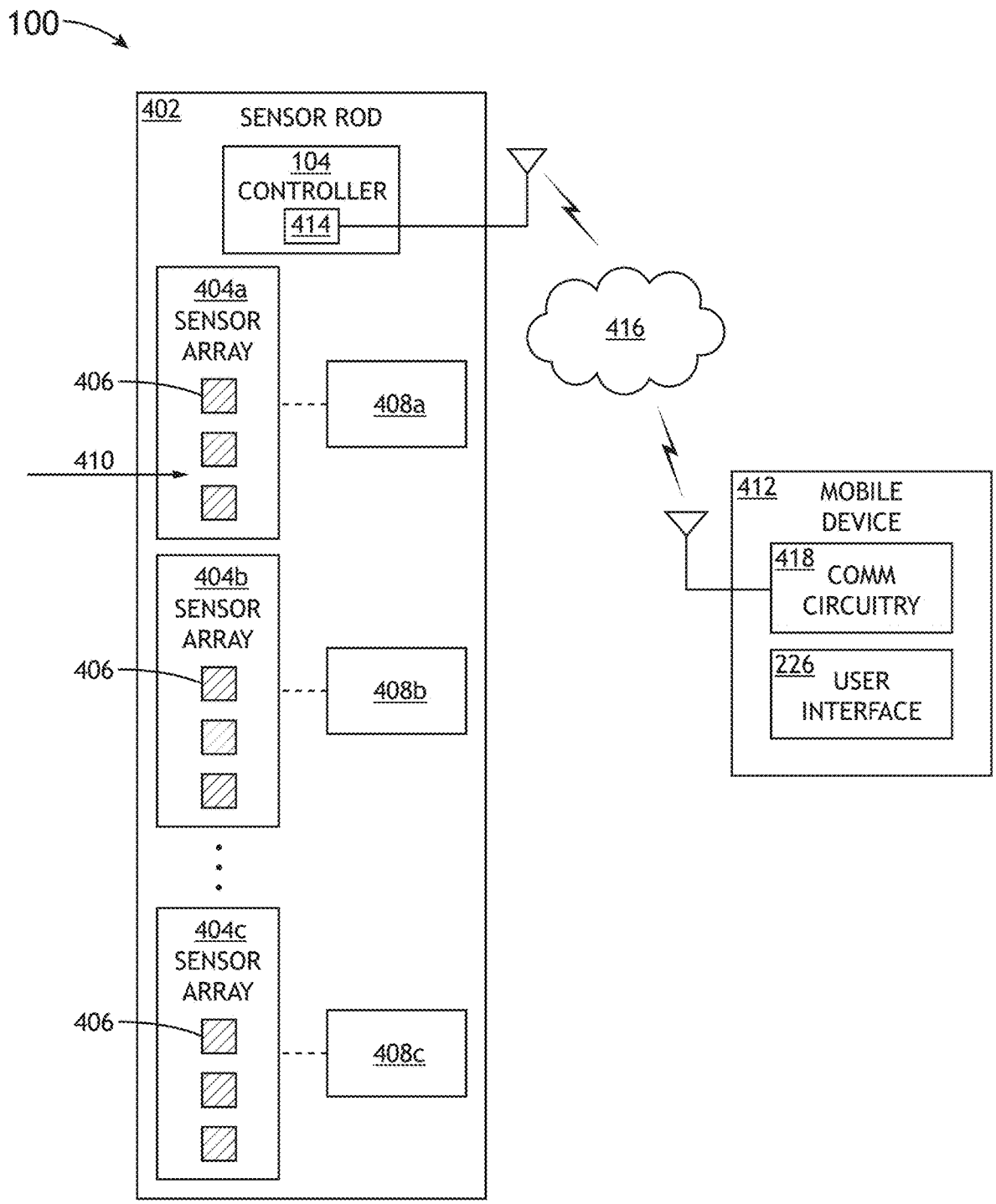
FIG. 4C illustrates a simplified block diagram of a sensor rod assembly for measuring elevations, in accordance with one or more embodiments of the present disclosure.

In another embodiment, as illustrated in FIG. 4C, the communication circuitry 414 of the controller 104 may include one or more network interface devices for interfacing with a network 416 (i.e., the cloud). In addition, the mobile device 412 may include communication circuitry 418 which may include one or more network interface devices also suitable for interfacing with the network 416. The network interface devices may include any network interface devices known in the art. For instance, the network interface devices may include wireline-based interface devices (e.g., DSL-based interconnection, Cable-based interconnection, T9-based interconnection, and the like). In another instance, the network interface devices may include a wireless-based interface device employing GSM, GPRS, CDMA, EV-DO, EDGE, WiMAX, LTE, Wi-Fi protocols, and the like. It is further noted that that the general architecture of FIG. 4C, where the controller 104 is disposed on or housed within the sensor rod 402 may be extended to any of the various embodiments of the present disclosure.

The one or more processors 220 of the controller 104 may include any one or more processing elements known in the art. In this sense, the one or more processors 220 may include any microprocessor device configured to execute algorithms and/or instructions. In one embodiment, the one or more processors 220 may be embodied as computer, mainframe computer system, workstation, image computer, parallel processor, handheld computer (e.g. tablet, smartphone, or phablet), or other computer system (e.g., networked computer) configured to execute a program configured to operate the sensor rod assembly 100, as described throughout the present disclosure. It should be recognized that the steps described throughout the present disclosure may be carried out by a single computer system or, alternatively, multiple computer systems. In general, the term "processor" may be broadly defined to encompass any device having one or more processing or logic elements, which execute program instruction from a memory 222 (i.e., non-transitory memory medium). Moreover, different subsystems of the sensor rod assembly 100 (e.g., the master stick 102, the one or more extension sticks 106 and/or the user interface device 226 (e.g., as illustrated in FIGS. 1A-3E); the sensor rod 402, and/or the mobile device 412) may include processor or logic elements suitable for carrying out at least a portion of the steps described throughout the present disclosure. Therefore, the above description should not be interpreted as a limitation on the scope of the present disclosure but merely an illustration.

The memory 222 may include any storage medium known in the art suitable for storing program instructions executable by the associated one or more processors 220 and/or results from the detection circuitry 310 (e.g., as illustrated in FIGS. 1A-3E), the detection circuitry 408a-408c, and/or the one or more processors 220. For example, the memory 222 may include a non-transitory memory medium. For instance, the memory 222 may include, but is not limited to, a read-only memory, a random-access memory, a magnetic or optical memory device (e.g., disk), a solid-state drive and the like. In another embodiment, the memory 222 is configured to provide display information to a display device of the user interface device 226 and/or the output of the various steps described herein. It is further noted that memory 222 may be housed in a common controller housing with the one or more processors 220. In an alternative embodiment, the memory 222 may be located remotely with respect to the physical location of the processors 220 and the controller 104. For example, the one or more processors 220 of the controller 104 may access a remote memory (e.g., server), accessible through a network (e.g., internet, intranet and the like).

The user interface device 226 may include any display device known in the art. In one embodiment, the display device may include, but is not limited to, a liquid crystal display (LCD). In another embodiment, the display device may include, but is not limited to, an organic light-emitting diode (OLED) based display. In another embodiment, the display device may include, but is not limited to a CRT display. In another embodiment, the display device 228 may include a set of lighted or light-able buttons. Those skilled in the art should recognize that a variety of display devices may be suitable for implementation in the embodiments of the present disclosure and the particular choice of display device may depend on a variety of factors, including, but not limited to, form factor, cost, and the like. In a general sense, any display device 228 capable of integration with the one or more user input devices 230 (e.g., touchscreen, bezel mounted interface, keyboard, mouse, trackpad, and the like) is suitable for implementation in the present disclosure.

The one or more user input devices 230 of the user interface device 226 may include, but is not limited to, a keyboard, a keypad, a touchscreen, a lever, a knob, a scroll wheel, a track ball, a switch, a dial, a sliding bar, a scroll bar, a slide, a handle, a touch pad, a paddle, a steering wheel, a joystick, a button, a bezel input device or the like. In the case of a touchscreen interface, those skilled in the art should recognize that a large number of touchscreen interfaces may be suitable for implementation in the embodiments of present disclosure. For example, the display device 228 may be integrated with a touchscreen interface, such as, but not limited to, a capacitive touchscreen, a resistive touchscreen, a surface acoustic based touchscreen, an infrared based touchscreen, or the like. In a general sense, any touchscreen interface capable of integration with the display portion of a display device 228 is suitable for implementation in the embodiments of the present disclosure. In another embodiment, the one or more user input devices 230 may include, but is not limited to, a set of buttons disposed on a surface of the controller 104 or the mobile device 412.

Figure 4F:
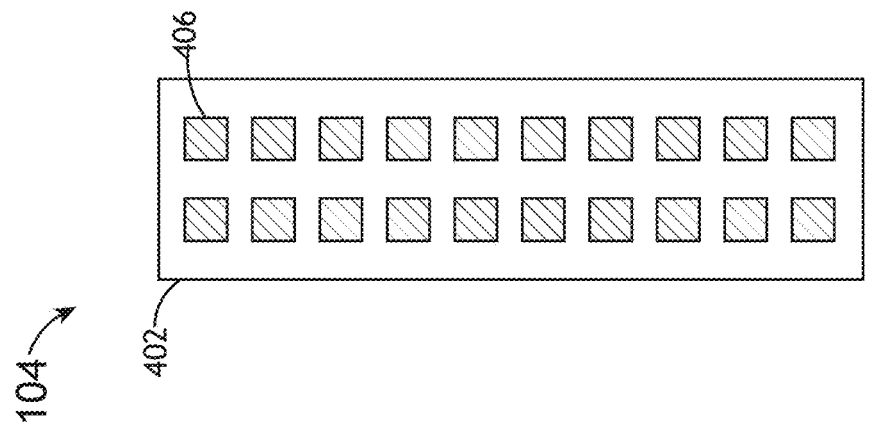
FIG. 4F illustrates a simplified block diagram of a layout pattern of sensors in a sensor rod assembly for measuring elevations, in accordance with one or more embodiments of the present disclosure.
Figure 4E:
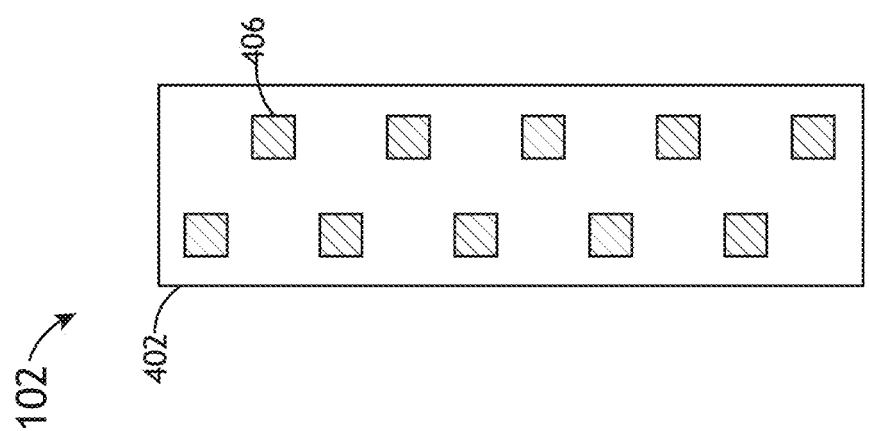
FIG. 4E illustrates a simplified block diagram of a layout pattern of sensors in a sensor rod assembly for measuring elevations, in accordance with one or more embodiments of the present disclosure.
Figure 4D:
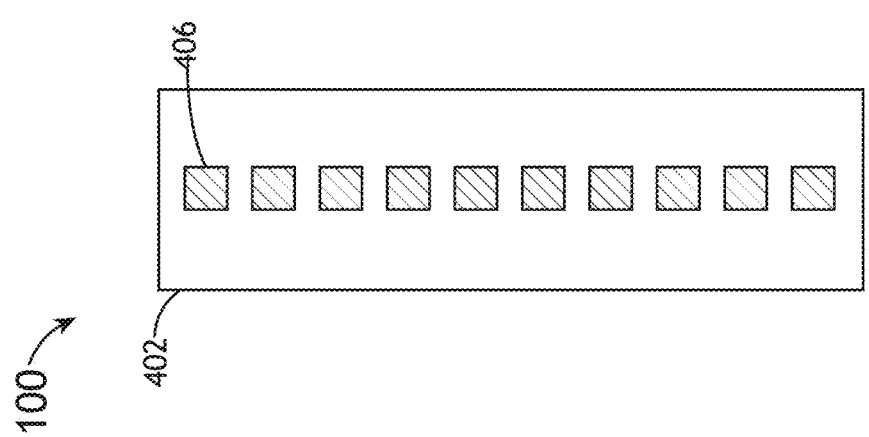
FIG. 4D illustrates a simplified block diagram of a layout pattern of sensors in a sensor rod assembly for measuring elevations, in accordance with one or more embodiments of the present disclosure.

FIGS. 4D-4F illustrate various layout patterns of the sensor devices 406 of the sensor rod 402, in accordance with one or more embodiments of the present disclosure.

In one embodiment, as illustrated in FIG. 4D, the sensor devices 406 may be disposed on the sensor rod 402 in a linear pattern. In this regard, the sensor devices 406 may generally be arranged in a column that runs the length of the sensor rod 402.

In another embodiment, as illustrated in FIG. 4E, the sensor devices 406 may be disposed on the sensor rod 402 in a staggered pattern. In this regard, the sensor devices 406 may generally be arranged in an alternating staggered pattern that runs the length of the sensor rod 402.

In another embodiment, as illustrated in FIG. 4F, the sensor devices 406 may be disposed on the sensor rod 402 in a staggered pattern. In this regard, the sensor devices 406 may generally be arranged in a set of rows that run the length of the sensor rod 402.

It is noted herein that the various depictions in FIGS. 4D-4F are not limitations on the scope of the present disclosure and are provided merely for illustrative purposes. It is contemplated that the sensor devices 406 of the sensor rod assembly 100 may be arranged in any number of equivalent patterns and/or layouts.

In addition, it is noted herein the sensor rod assembly 100 may be constructed to have any sensor device density. For example, the lineal density of sensor devices 406 along the sensor rod 402 may be between, but is not limited to, 5 and 500 devices per lineal foot. For instance, the sensor device density may be between 50 and 100 sensor devices per lineal foot. In addition, such as an embodiment equipped with the lens array 516, the sensor device density may be between 10 and 15 sensor devices per lineal foot.

Generally, one or more of a top board 200 and/or components of the top board 200 (e.g., as illustrated in FIGS. 3A and 3B), a middle board 202 and/or components of the middle board 202 (e.g., as illustrated in FIG. 3C), a bottom board 204 and/or components of the bottom board 204 (e.g., as illustrated in FIGS. 3D and 3E), and/or a sensor rod 402 and/or components of the sensor rod 402 (e.g., as illustrated in FIGS. 4A-4F) may include, but are not limited to, one or more sensor units with sensors, one or more detection units with detection circuitry, one or more logic devices with latches and/or shift registers, one or more comparators, one or more resistors, one or more optical devices (e.g., lenses, lens arrays, gratings, prisms, mirrors, optical guides, optical fibers, filters, or the like), one or more logic processor elements, or other components necessary to determine a location of a laser beam impinging on the sensor rod assembly 100. Therefore, the above description should not be interpreted as a limitation on the scope of the present disclosure but merely an illustration.

FIGS. 5A-5E in general illustrate a system for surveying of a project site with the sensor rod assembly 100 and generating of maps of the surveyed project site, in accordance with one or more embodiments of the present disclosure.

Figure 5A:
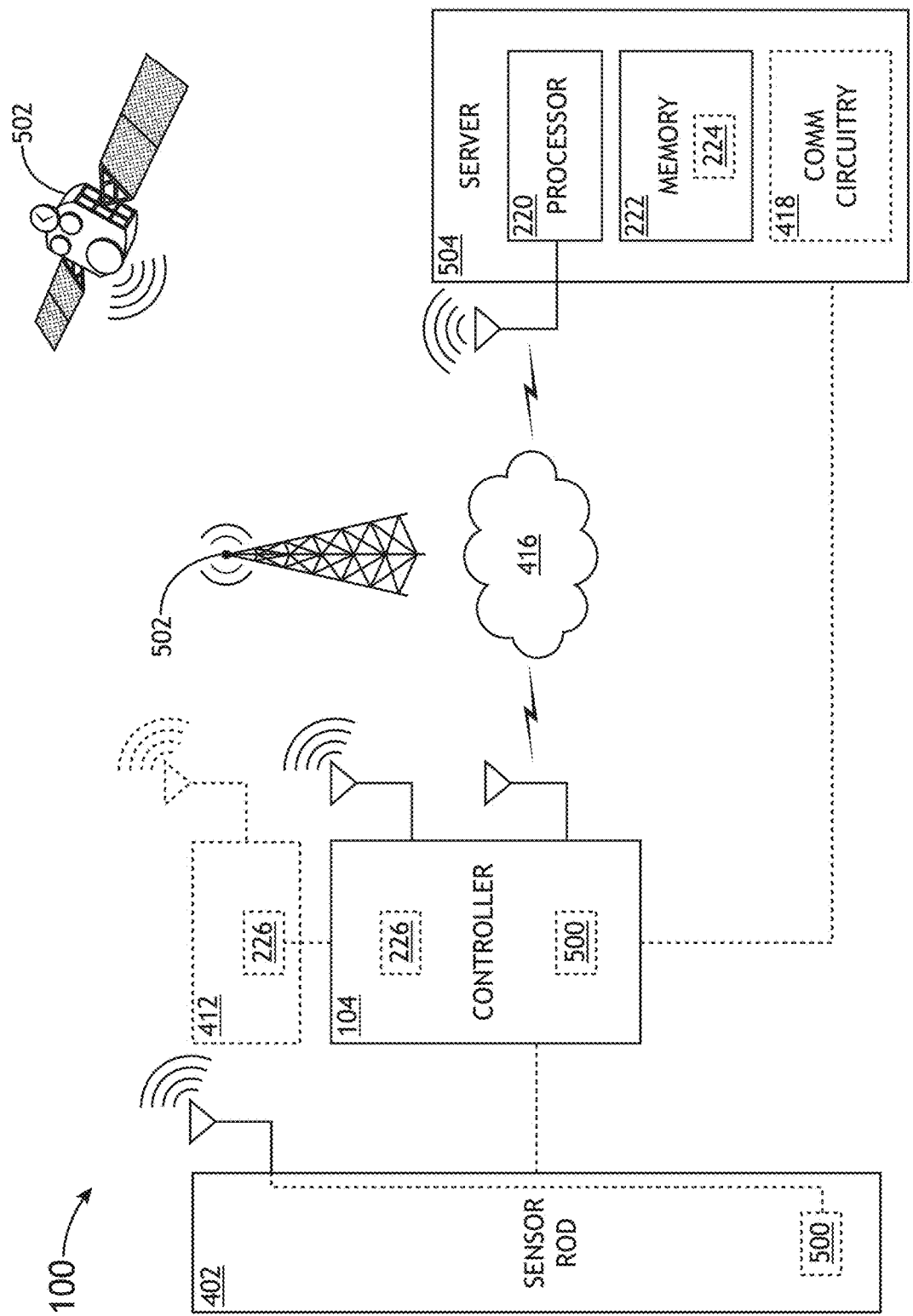
FIG. 5A illustrates a simplified block diagram of a system for surveying of a project site with a sensor rod assembly and generating of maps of the surveyed project site, in accordance with one or more embodiments of the present disclosure.

In one embodiment, as illustrated in FIG. 5A, the sensor rod 402 and/or the controller 104 of the sensor rod assembly 100 may be coupled to (e.g., physically, electrically, and/or communicatively) and configured to receive data from one or more location systems 500. For example, the one or more location systems 500 may include, but are not limited to, one or more receivers, processors, memory, or other components for receiving data and determining locations. It is noted herein the one or more location systems 500 may be able to automatically record the position of the sensor rod 402. It is noted herein that any embodiments directed to processors and/or memory throughout the disclosure may be directed to the processors and/or memory of the one or more location systems 500.

In another embodiment, the one or more location systems 500 are coupled to (e.g., physically, electrically, and/or communicatively) to and in communication with one or more satellites and/or terrestrial communication towers 502 of one or more global position systems (e.g., GPS, GNSS, GLONASS and the like). For example, the one or more location systems 500 in the controller 104 and/or the sensor rod 402 may be directly coupled (e.g., via an antenna) to the one or more satellites and/or terrestrial communication towers 502 of one or more global position systems. By way of another example, the one or more location systems 500 in the controller 104 and/or the sensor rod 402 may be indirectly coupled (e.g., via a mobile device 412) to the one or more satellites and/or terrestrial communication towers 502 of the one or more global position systems.

The one or more satellites and/or terrestrial communication towers 502 of the one or more global position system may provide location coordinate data to one or more components/systems of the sensor rod assembly 100. For example, the one or more location systems 500 may be implemented as a global navigation satellite system (GNSS) device, and the one or more satellites 502 of the one or more global position systems may be implemented as GNSS satellites. For instance, the one or more location systems 500 may receive or calculate location data from a sufficient number of satellites 502 (e.g., at least four) of the one or more global position systems, such that a GPS solution may be calculated for the sensor rod assembly 100.

In another embodiment, the controller 104 and/or the sensor rod 402 may be coupled to (e.g., physically, electrically, and/or communicatively) a server 504. The server 504 may include one or more processors 220. The one or more processors 220 may be communicatively coupled to memory 222. The memory 222 may be configured to store one or more sets of program instructions 224. The one or more processors 220 may be configured to execute a set of program instructions 224 stored in memory 222 configured to perform one or more of the various steps described throughout the present disclosure. It is noted herein that any embodiments directed to the one or more processors 220, memory 222, and one or more sets of program instructions 224 may be directed to the one or more processors 220, memory 222, and one or more sets of program instructions 224 of the server 504.

In another embodiment, the controller 104 and/or the server 504 includes one or more network interface devices for interfacing with the network 416 (i.e., the cloud). In another embodiment, the controller 104 and/or the server 504 includes communication circuitry 418 which may include one or more network interface devices also suitable for interfacing with the network 416. The network interface devices may include any network interface devices known in the art. For instance, the network interface devices may include wireline-based interface devices (e.g., DSL-based interconnection, Cable-based interconnection, T9-based interconnection, and the like). In another instance, the network interface devices may include a wireless-based interface device employing GSM, GPRS, CDMA, EV-DO, EDGE, WiMAX, LTE, Wi-Fi protocols, long-range wireless protocols (e.g., 3G, 4G, 4G LTE, and/or 5G), and the like.

Figure 5B:
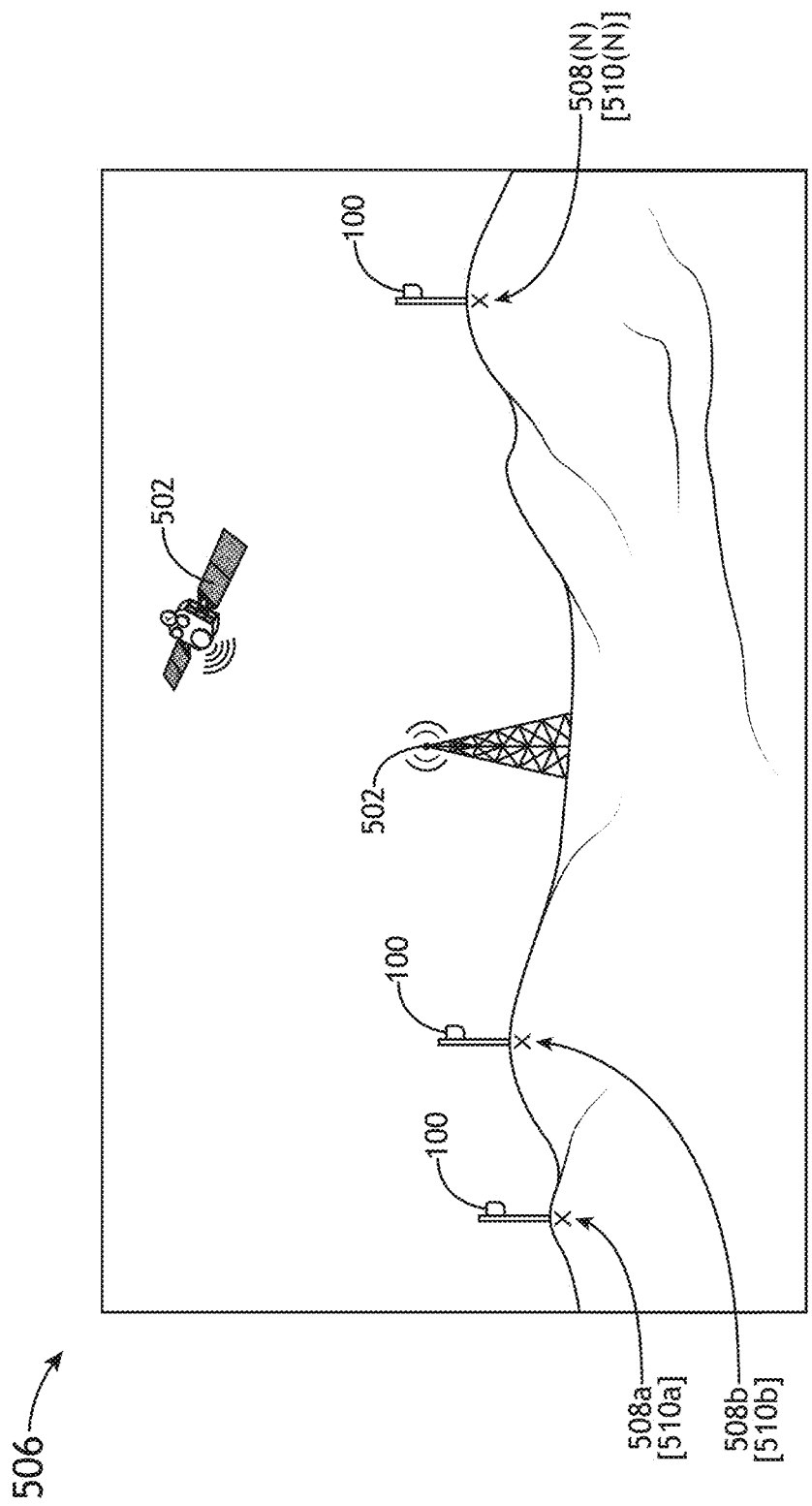
FIG. 5B illustrates a project site being surveyed with a sensor rod assembly, in accordance with one or more embodiments of the present disclosure.

In one embodiment, as illustrated in FIG. 5B, the global position system receiver 420 and an associated user interface device 226 (e.g., either installed within the controller 104 or communicatively coupled to the controller 104 as part of a mobile device 412) is used to record one or more locations on a project site 506 being surveyed, each location having a select elevation. For example, the project site 506 may be broken into areas defined by locations 508a, 508b, [ . . . ] 508(N), each with a corresponding elevation 510a, 510b, [ . . . ] 510(N). For instance, a user may position the sensor rod assembly 100 at a first location 508a, record the corresponding elevation 510a, move onto a second location 508b, record the corresponding elevation 510b, and so on until moving to an Nth location 508(N) with a corresponding elevation 510(N).

Figure 5C:
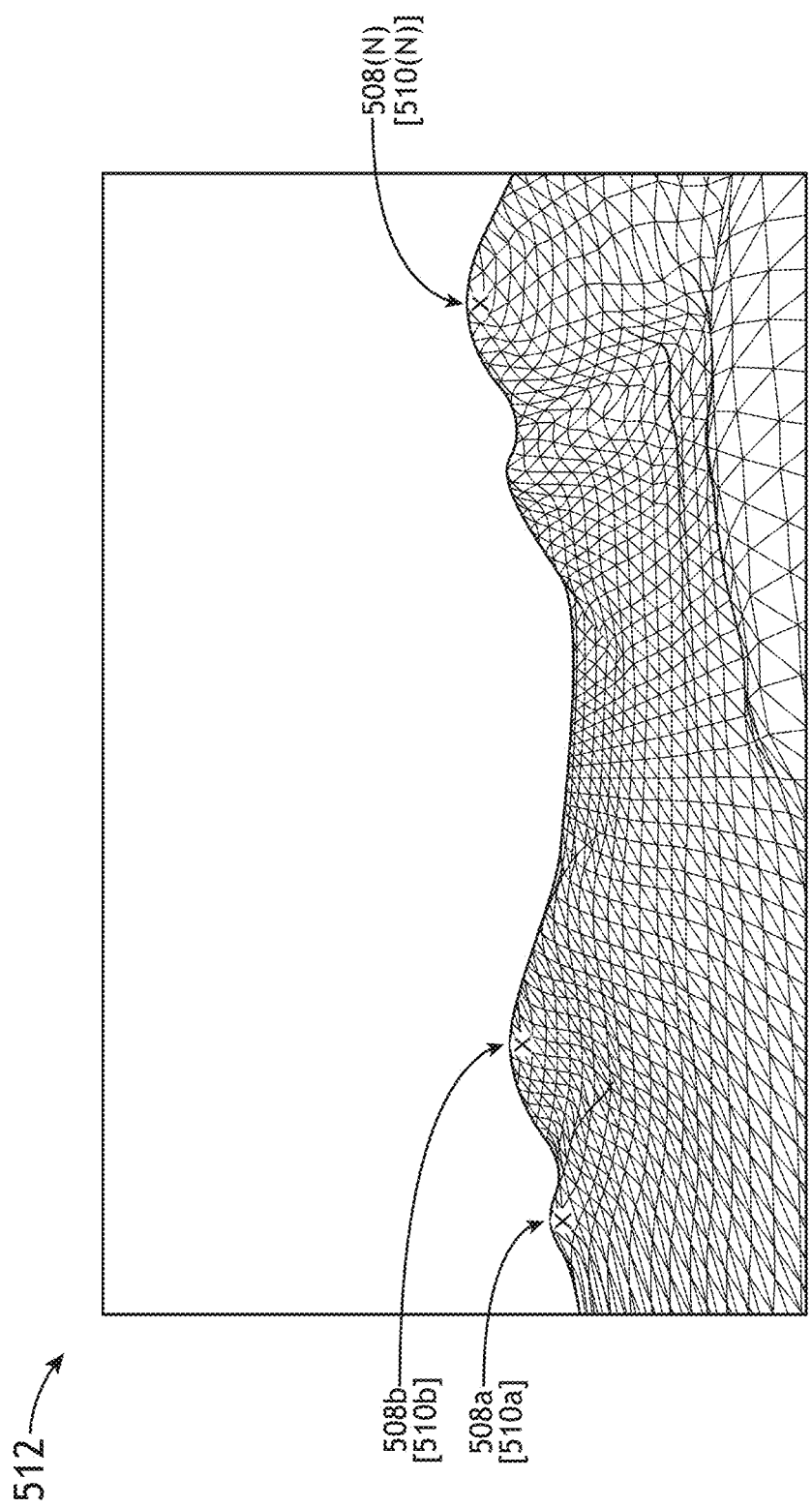
FIG. 5C illustrates a generated map of a project site surveyed with a sensor rod assembly, in accordance with one or more embodiments of the present disclosure.
Figure 5D:
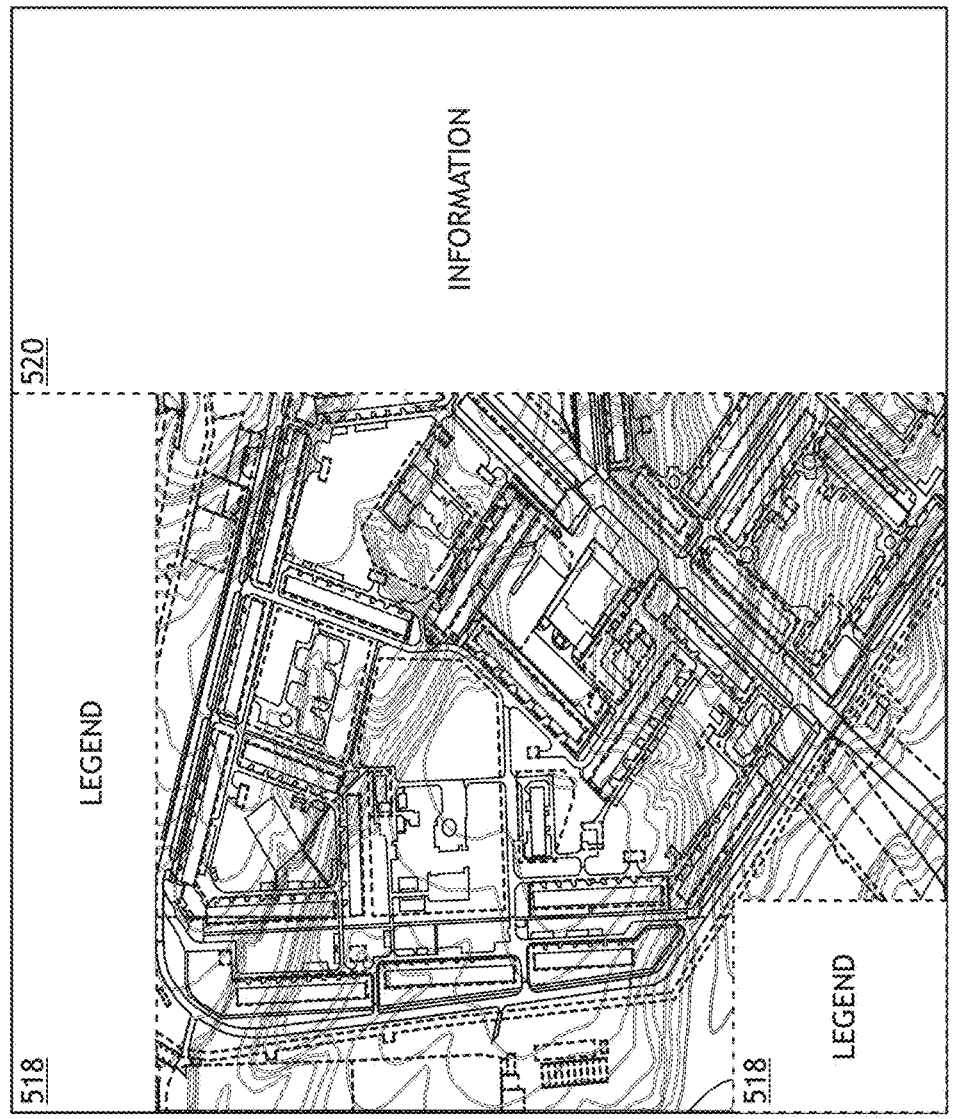
FIG. 5D illustrates a generated map of a project site surveyed with a sensor rod assembly, in accordance with one or more embodiments of the present disclosure.

In another embodiment, one or more maps may be generated by the server 504 from the recorded one or more locations, following the transfer of the recorded one or more locations from the sensor rod assembly 100 to the server 504. For example, as illustrated in FIG. 5C, a 3D gridded contour map 512 may be generated. By way of another example, as illustrated in FIG. 5D, a land survey map 514 may be generated. By way of another example, as illustrated in FIG. 5E, a topographical map 516 may be generated.

In another embodiment, the maps 512, 514, 516 include one or more legends 518 describing specific aspects illustrated in the maps 512, 514, 516. For example, the one or more legends 518 may describe references (e.g., reference points, selected benchmark elevations, a target elevation, a S-value for future users, or the like), meaning for symbols on the maps 512, 514, 516, or the like.

In another embodiment, the maps 512, 514, 516 include information 520. For example, the information 520 may be the recorded one or more locations. By way of another example, the information 520 may be related to the one or more locations. For instance, the information 520 may be data retrieved from global position systems 502 and accompanying location systems 500 for each location 508a, 508b, [ . . . ] 508(N). In addition, the information 520 may be data from a defined local (e.g., on-site, relative to a proximate area, or the like) mapping system for each location 508a, 508b, [ . . . ] 508(N) that does not utilize (e.g., is not reliant upon) the global position systems 502 and accompanying location systems 500. In this regard, the locations 508a, 508b, [ . . . ] 508(N) and corresponding elevations 510a, 510b, [ . . . ] 510(N) may be tied to a mapping system, whether defined by a global position system 502 or defined locally (e.g., on-site, relative to a proximate area, or the like).

The global position system receiver 420 and an associated user interface device 226 (e.g., either installed within the controller 104 or communicatively coupled to the controller 104 as part of a mobile device 412) may be used in automated calculation such as slope calculations discussed in additional detail further herein.

FIGS. 6A-6D illustrate various schematic views of the sensor rod assembly 100, in accordance with one or more embodiments of the present disclosure.

In one embodiment, the sensor rod 402 includes markings 600. For example, the markings 600 may be positioned on a faceplate of the sensor rod 402 in increments of 100th of a foot, or any other selected increment or unit of measure (e.g., meters). For instance, the markings 600 may range from, but are not limited to, zero feet to six feet. The markings 600 may be etched onto the sensor rod 402 and/or may be formed via printing, painting, drawing, affixing a printed sticker on a printed sticker, or any other method of marking currently known in the art. It is noted the markings 600 may be in other increments including, but not limited to, 16th of a foot, 10th of a foot, or quarter-foot and may be provided in any other unit system (e.g., metric).

It is noted that for purpose of the present disclosure, all elevations are to be understood as being "above sea level." For example, "1000.00 feet" is meant to be understood as "1000.00 feet above sea level." It is noted, however, that this convention is provided merely for purposes of illustration and should not be interpreted as a limitation on the scope of the present disclosure. In general, an elevation may be defined as any height above a reference point.

In one embodiment, the sensor rod 402 includes a set of sensor devices 406. For example, the set of sensor devices 406 may include any of the sensor devices 406 described previously herein configured in any many described previously herein. For example, the sensor rod 402 may include a sensor every $1/100^{th}$ of a foot (e.g. a six-foot elevation rod includes 600 sensors). It is noted the plurality of sensor devices 406 may be spaced in other increments including, but not limited to, 1/16 of a foot, 1/10 of a foot, 1/4 of a foot, meters, or any increment of a meter. In another embodiment, the plurality of sensor devices 406 may be housed on a pre-fabricated grid array.

In another embodiment, the sensor rod 402 includes a set of lights 602 running the length of the sensor rod 402. For example, the set of lights may include, but are not limited to, a set of LEDs. In one embodiment, the set of lights 602 are communicatively coupled to the one or more processors 220 of the controller 104 such that the one or more processors 220 control the ON/OFF state of the lights. In this regard, upon a laser beam detection, the one or more processors 220 may cause one or more lights proximate to the position of detection to illuminate, serving as a visual marked to a user. Further, the light may remain on until turned off by a user so as to provide a semi-permanent marker of the last laser level detection.

As discussed previously herein, the assembly 100 includes a user interface device 226. The user interface device 226 may include a display device 228 and/or a user input device 230 as discussed previously herein.

Figure 6A:
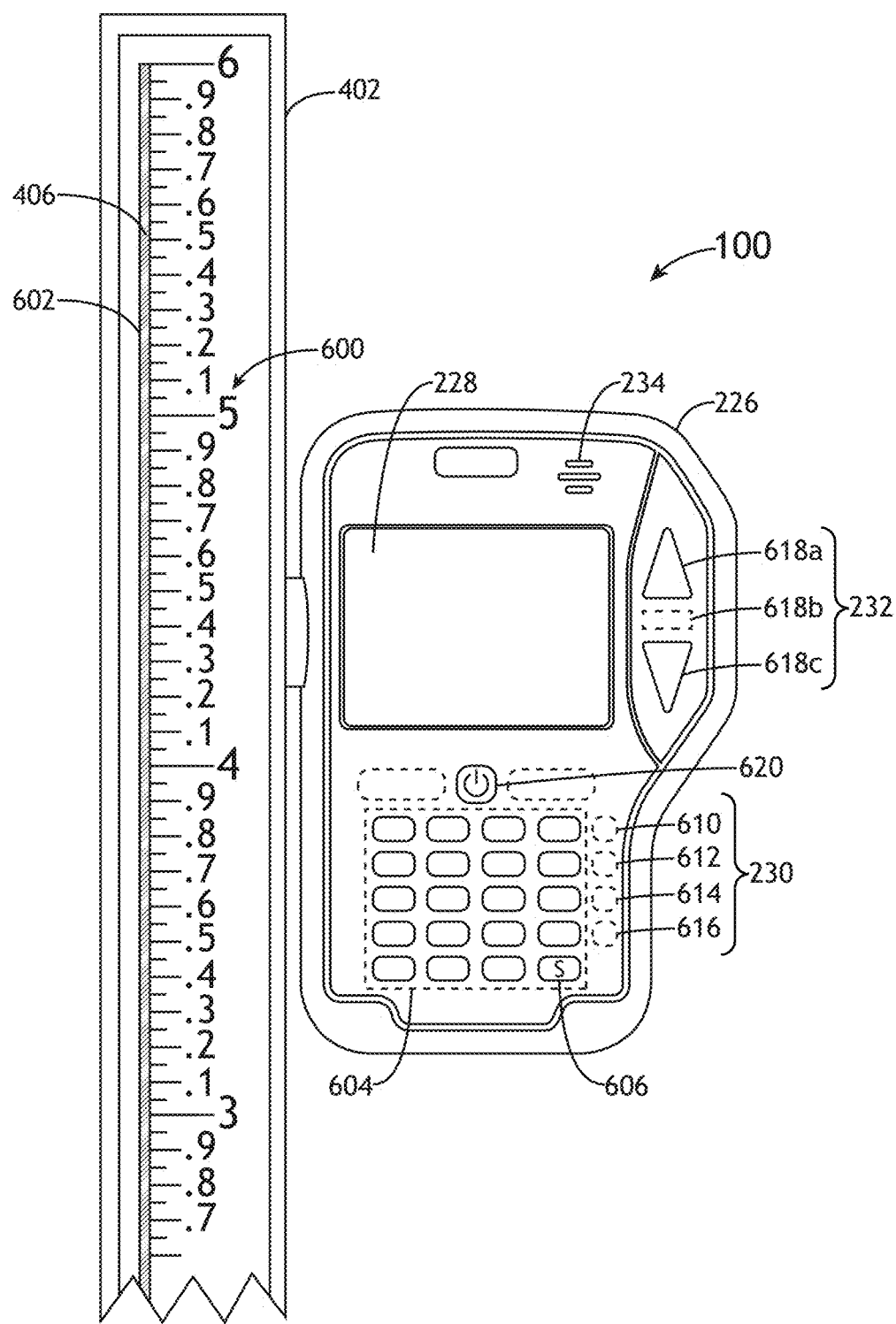
FIG. 6A illustrates a simplified block diagram of a portion of a sensor rod assembly for measuring elevations, in accordance with one or more embodiments of the present disclosure.
Figure 6B:
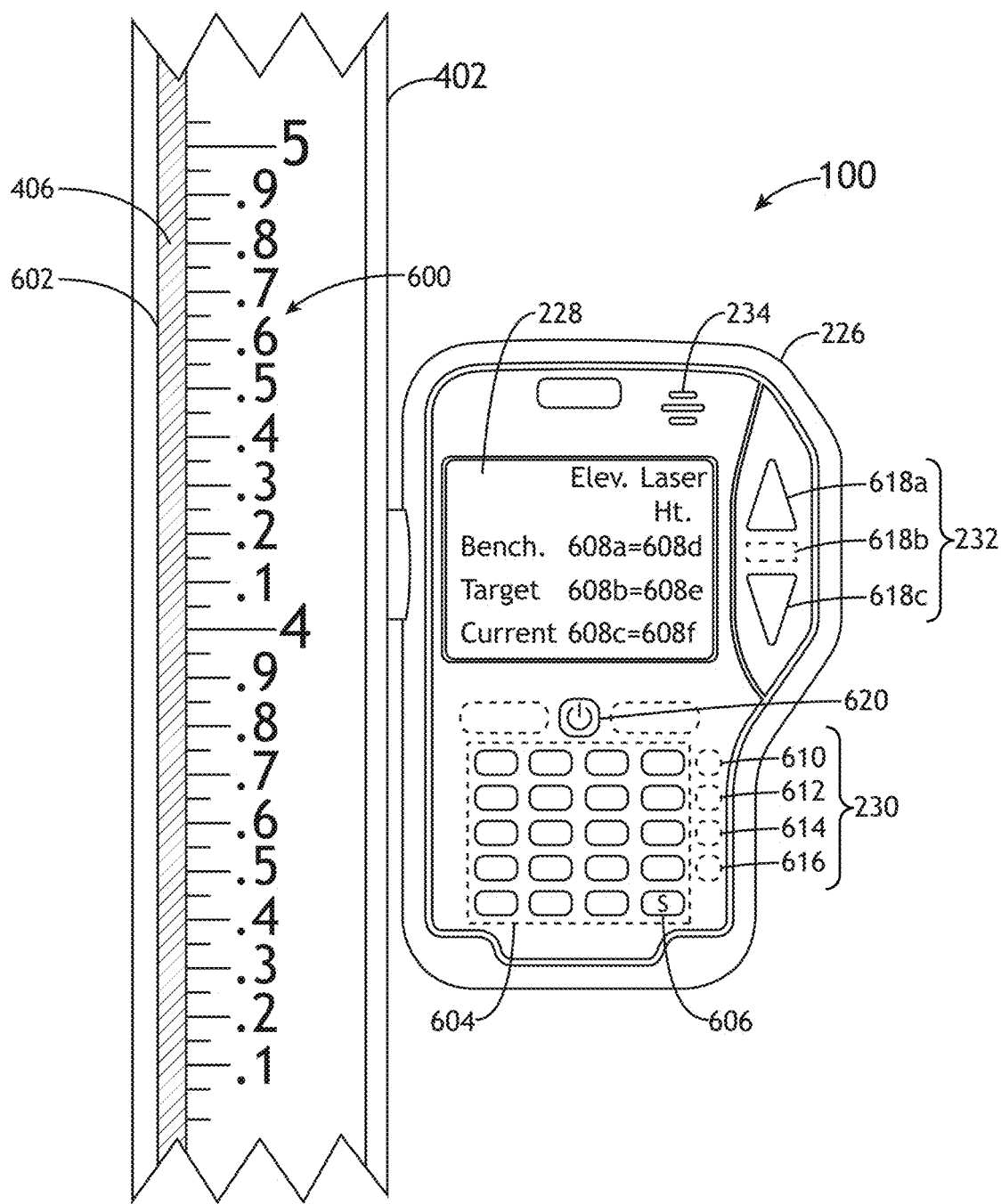
FIG. 6B illustrates a simplified block diagram of a portion of a sensor rod assembly for measuring elevations, in accordance with one or more embodiments of the present disclosure.
Figure 6C:
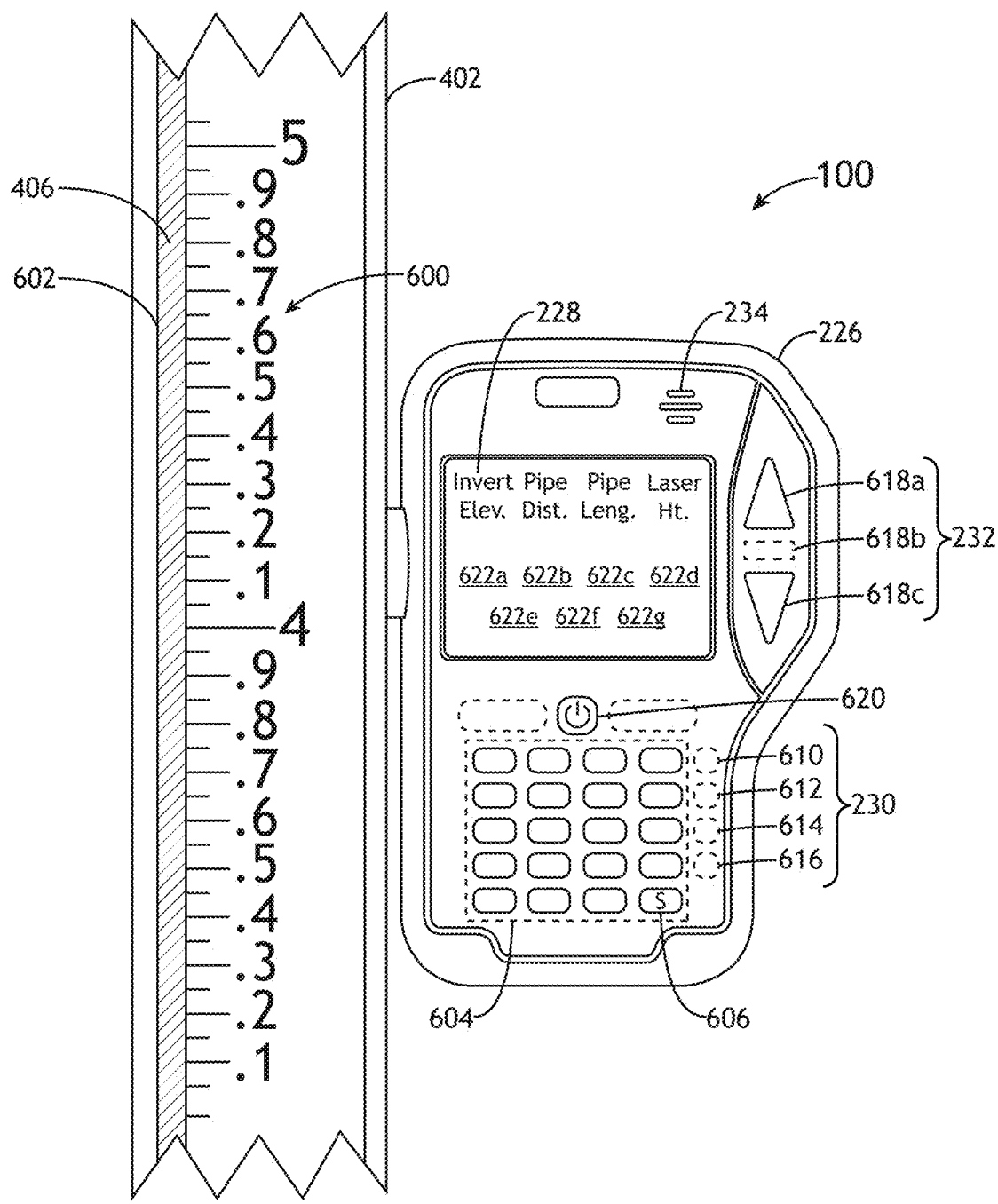
FIG. 6C illustrates a simplified block diagram of a portion of a sensor rod assembly for measuring elevations, in accordance with one or more embodiments of the present disclosure.
Figure 6D:
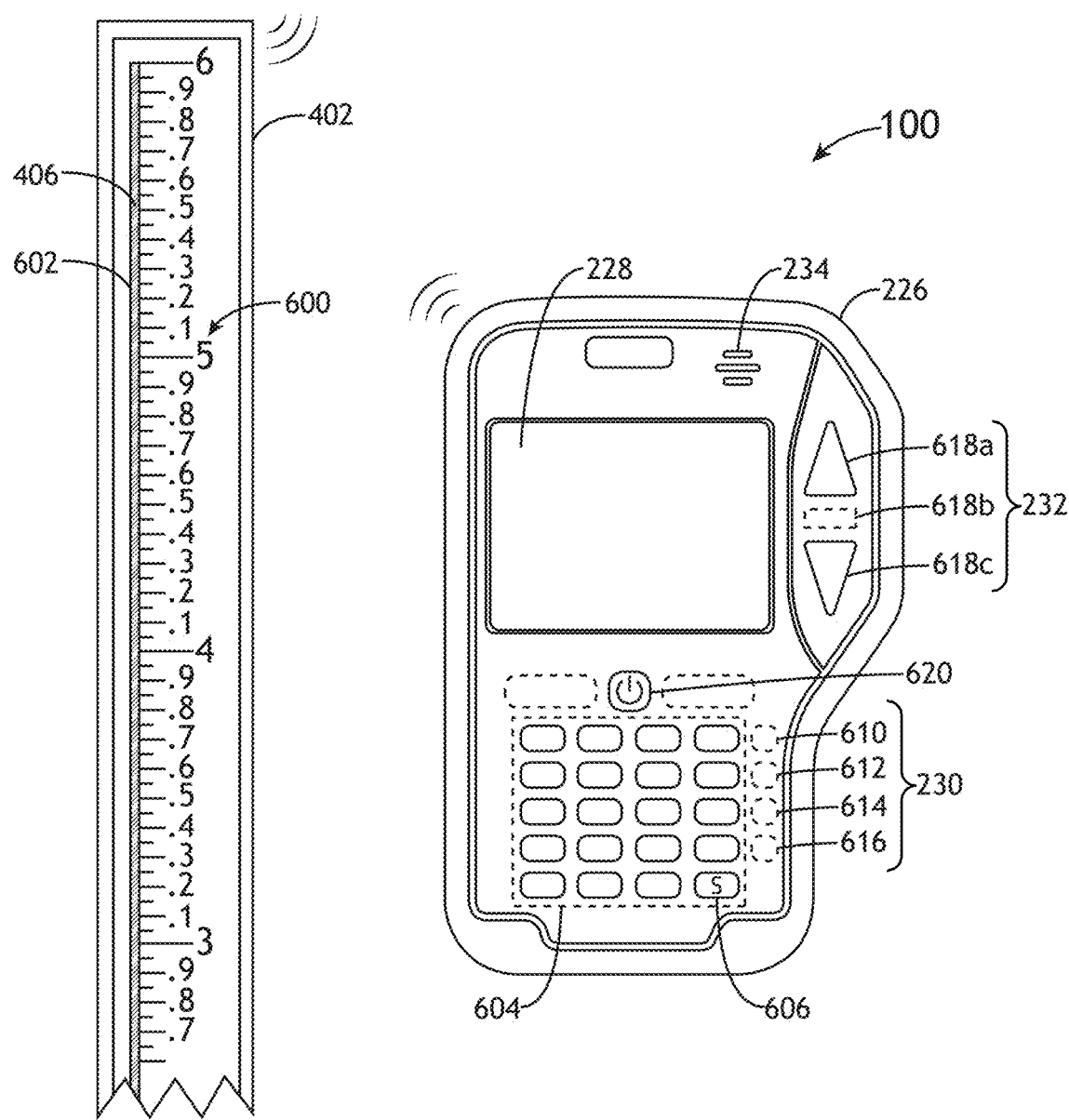
FIG. 6D illustrates a simplified block diagram of a portion of a sensor rod assembly for measuring elevations, in accordance with one or more embodiments of the present disclosure.

In one embodiment, as illustrated in FIGS. 6B-6D, the one or more user input devices 230 includes a numeric keypad 604, where the numeric keypad 604 includes basic calculator functions. In another embodiment, the one or more user input devices 230 include a SET button 606.

In another embodiment, the information displayed on the display device 228 may include one or more input values including, but not limited to, a benchmark elevation 608a, a target elevation 608b, and a laser-sensor registered elevation 608c. For instance, information displayed on the display device 228 may further include one or more calculated or determined values including, but not limited to, a laser height benchmark 608d, a laser height target 608e, and a laser-sensor registered current height 608f, a cut/fill amount (not illustrated on the display device 228) or a slope instruction (not illustrated on the display device 228). It is noted that the controller 104 may automatically calculate and display the values 608d, 608e, and 608f for the inputted or measured values 608a, 608b, and 608c, respectively.

In another embodiment, the input values 608a and 608b may be independently offered by the user. For example, the user may input the benchmark elevation 608a or the target elevation 608b. In another embodiment, the user input may be a selection and/or instructions in response to data displayed to the user via the display device 228. For example, the user may utilize the user input device 230 to calculate elevations based on the information displayed on the display device 228, where the calculations are completed by the one or more processors 220.

In another embodiment, the one or more user input devices 230 include a set of input buttons 610, 612, 614 and 616. In one embodiment, pressing the button 610 may allow a user to input the benchmark elevation 608a. In another embodiment, the user interface device 226 includes a button 612. For example, pressing the button 612 allows the user to input and/or calculate the target elevation 608b. In another embodiment, the user interface device 226 includes a button 614. For example, pressing the button 614 allows the user to receive a cut/fill amount based on the target elevation 608b and the current elevation, whereby the current elevation is determined by the one or more processors 220 based on the measured current height (via sensor devices 406). It is noted herein that the "cut" amount is the amount of ground or surface that must be removed from the current elevation to achieve the target elevation, while the "fill" amount is the amount of ground or surface that must be added to the current elevation to achieve the target elevation.

In another embodiment, the user interface device 226 includes a button 616. For example, pressing the button 616 prompts the user to input elevation and distance data to allow the controller 104 to calculate a slope and/or slope instructions. For example, pressing the slope button 616 may prompt the controller 104 to register the current elevation and then request an additional elevation from the user. In addition, the slope function may prompt the controller to register the current position (e.g., register GPS coordinates) and request an additional position. Based on these two pairs of values the controller 104 may calculate a slope. In another embodiment, the user interface device 226 may request the number of measurements to take between the two positions, which may be entered by the user via the user interface device 226.

In another embodiment, the user interface device 226 includes the one or more lights 232 including, but not limited to, lights 618a, 618b, and/or 618c. For example, lights 618a, 618b, and/or 618c indicate the direction in which the sensor rod 402 must move to reach the target elevation. For instance, light 618a may inform the user the current laser-sensor registered elevation 608c is lower than the target elevation 608b and that the sensor rod 402 needs to be raised. In addition, light 618c may illuminate in order to inform the user the current laser-sensor registered elevation 608c is higher than the target elevation 608b and that the sensor rod 402 needs to be lowered. Further, light 618b may inform the user that the current laser-sensor registered elevation 608c matches the target elevation 608b.

In another embodiment, the user interface device 226 may include the speaker 234, through which the controller 104 may provide one or more alerts to a user. For example, as the current laser elevation approaches the target elevation, the controller 104 may direct the user interface device 226 to emit an auditory/audible/audio alert (e.g., voice, beep, etc.). to warn the user the current laser-sensor registered elevation 608c is approaching the target elevation 608b.

In another embodiment, the one or more user input devices 230 include a power button 620.

FIG. 6C illustrates a schematic view for an implementation of a slope calculation, in accordance with one or more embodiments of the present disclosure. In one embodiment, the sensor rod assembly 100 may be automated for providing pipe-laying instructions. It is noted that the following example is provided merely for illustrative purposes and should not be interpreted a limitation on the scope of the present disclosure. It is noted that system may be adapted to provide grading instructions in any context. By way of example, in the case of pipe grading, the values displayed on the display device 228 may include, but are not limited to, a set of invert elevation values 622b, a set of pipe distance values 622c, a set of pipe length values 622d, and a set of current height values 622e. It is noted that the one or more of the set of invert elevation values 622b, the set of pipe distance values 622c, the set of pipe length values 622d, and the set of current height values 622e are inter-related. For example, one or more of the values 622b-622e may be used for calculating the elevation grading necessary to lay a pipe at a project site. The set of values 622b-622e may be displayed in feet, inches, yards, centimeters, meters or any other unit of measure.

In one embodiment, the user inputs a pipe length into the controller 104 via the user interface device 226. In another embodiment, the user inputs a pipe section length into the controller 104 via the user interface device 226. In another embodiment, a set of counting values 622a are displayed on the display device 228 to give the user an indication of which section he is currently considering. For example, where the pipe length is 100.00 feet and the pipe section length is 8.00 feet, the 100-foot pipe is comprised of twelve 8-foot sections and one 4-foot section for a total of thirteen sections. Thus, the plurality of counting values 622a on the display device 228 may count from position zero (indicating the initial position of the pipe—the beginning of pipe section 1 at 0.00 feet) and position thirteen (indicating the final position of the pipe—the end of pipe section 13 at 100.00 feet). It is noted herein that pipe length sections may alternatively be lengths other than 8.00 feet.

In another embodiment, the user interface device 226 displays the initial laser-sensor registered height value based on a laser reading measured by the sensor devices 406 on the sensor rod 402. For example, the user interface device 226 may display the laser reading measurement as the position zero value of the set of height values. In another embodiment, the user inputs a starting elevation value for the pipe into the controller 104 via the user interface device 226. For example, the controller 104 may display the starting elevation value as the position zero value of the set of invert elevation values 622b. In addition, the starting elevation value may correspond to a measure elevation value acquired with the one or more sensor devices 406. In another embodiment, the user inputs a final elevation value for the pipe into the controller 104 via the user interface device 226. Further, controller 104 may display the final elevation value as the final position value of the set of invert elevation values 622b.

In another embodiment, the controller 104 calculates one or more of the set of invert elevation values 622b, the set of pipe distance values 622c, the set of pipe length values 622d, and the plurality of the current height values 622e based on one or more of the input pipe length, pipe section length, laser-sensor registered current height, starting elevation, and ending elevation values.

By way of example, in a case where the pipe length is 100.00 feet, the pipe section length is 8.00 feet, the laser-sensor registered stick current height is 1.00 foot, the starting elevation is 1000.00 feet, and the ending elevation is 995.00 feet, the display device 228 may display the following values for 622a-622e:

| 622a | 622b | 622c | 622d | 622e |
|---|---|---|---|---|
| 0 | 1000.00 | 0 | 8 | 1.00 |
| 1 | 999.60 | 8 | 8 | 1.40 |
| 2 | 999.20 | 16 | 8 | 1.80 |
| 3 | 998.80 | 24 | 8 | 2.20 |
| 4 | 998.40 | 32 | 8 | 2.60 |
| 5 | 998.00 | 40 | 8 | 3.00 |
| 6 | 997.60 | 48 | 8 | 3.40 |
| 7 | 997.20 | 56 | 8 | 3.80 |
| 8 | 996.80 | 64 | 8 | 4.20 |
| 9 | 996.40 | 72 | 8 | 4.60 |
| 10 | 996.00 | 80 | 8 | 5.00 |
| 11 | 995.60 | 88 | 8 | 5.40 |
| 12 | 995.20 | 96 | 8 | 5.80 |
| 13 | 995.00 | 100 | 4 | 6.00 |

It is noted herein that the controller 104 may modify the calculations necessary to fill in the set of values as necessary to accommodate a pipe length that is not divisible by the input pipe section length value. For example, as illustrated above, the calculations to the determine the values 622b-622e for the position 13 value of 622a would be modified by the controller 104 to take into account the last pipe section, pipe section 13, being only 4.00 feet in length.

In another embodiment, the controller 104 allows the user to scroll through the set of values displayed on the display device 228 and find the appropriate elevation to lay pipe or a pipe section. For example, the user would know the first pipe section would start at 1000.00 feet, the second pipe section would start at 999.60 feet, the third pipe section would start at 999.20 feet, and the like.

In another embodiment, the controller 104 calculate and displays an invert elevation 622g and a current height 622h for a user-inputted current pipe length based on the starting elevation and ending elevation. For example, where the pipe length is 100.00 feet, the pipe section length is 8.00 feet, the laser-sensor registered current height is 1.00 foot, the starting elevation is 1000.00 feet, the ending elevation is 995.00 feet, and the current pipe length 622f is 28.00 feet, the display device 228 may display the following values for 622a-622h:

| 622a | 622b | 622c | 622d | 622e |
|---|---|---|---|---|
| 0 | 1000.00 | 0 | 8 | 1.00 |
| 1 | 999.60 | 8 | 8 | 1.40 |
| 2 | 999.20 | 16 | 8 | 1.80 |
| 3 | 998.80 | 24 | 8 | 2.20 |
| 4 | 998.40 | 32 | 8 | 2.60 |
| 5 | 998.00 | 40 | 8 | 3.00 |
| 6 | 997.60 | 48 | 8 | 3.40 |
| 7 | 997.20 | 56 | 8 | 3.80 |
| 8 | 996.80 | 64 | 8 | 4.20 |
| 9 | 996.40 | 72 | 8 | 4.60 |
| 10 | 996.00 | 80 | 8 | 5.00 |
| 11 | 995.60 | 88 | 8 | 5.40 |
| 12 | 995.20 | 96 | 8 | 5.80 |
| 13 | 995.00 | 100 | 4 | 6.00 |
| 622f 28 | | 622g 998.60 | | 622h 2.40 |

In another embodiment, the controller 104 includes an inputted pipe thickness value for the set of values 622a-622h. For example, the values displayed on the display device 228 may be calculated so as to compensate for the pipe diameter to help the user take the pipe thickness into account when grading the pipe bed on the project site. For instance, where the pipe length is 100.00 feet, the pipe section length is 8.00 feet, the laser-sensor registered stick height is 1.00 foot, the starting elevation is 1000.00 feet, the ending elevation is 995.00 feet, the current pipe length 622e is 28.00 feet, and a pipe has a thickness of 2 inches, or 0.16 feet, the controller 104 cause display device 228 to display the following values for 622a-622h:

| 622a | 622b | 622c | 622d | 622e |
|---|---|---|---|---|
| 0 | 999.84 | 0 | 8 | 1.16 |
| 1 | 999.44 | 8 | 8 | 1.56 |
| 2 | 999.04 | 16 | 8 | 1.96 |
| 3 | 998.64 | 24 | 8 | 2.36 |
| 4 | 998.24 | 32 | 8 | 2.76 |
| 5 | 997.84 | 40 | 8 | 3.16 |
| 6 | 997.44 | 48 | 8 | 3.56 |
| 7 | 997.04 | 56 | 8 | 3.96 |
| 8 | 996.64 | 64 | 8 | 4.36 |
| 9 | 996.24 | 72 | 8 | 4.76 |
| 10 | 995.84 | 80 | 8 | 5.16 |
| 11 | 995.44 | 88 | 8 | 5.56 |

| 622a | 622b | 622c | 622d | 622e |
|------|------|------|------|------|
| 12 | 995.04 | 96 | 8 | 5.96 |
| 13 | 994.84 | 100 | 4 | 6.16 |
| 622f 28 | | 622g 998.44 | | 622h 2.56 |

FIG. 6D illustrates a schematic view of the sensor rod assembly 100 including a wireless user interface device 226, in accordance with one or more embodiments of the present disclosure. As discussed previously herein, the user interface device 226 may be embodied in a wireless or mobile device 412, such as, but not limited to, a smartphone, a tablet, a laptop, a PDA or a dedicated mobile device. In this embodiment, the various buttons and user interface elements may be implemented as "soft" buttons displayed on a touchscreen display. It is noted that the various functions, features and components described previously herein with respect to FIGS. 6A-6C should be interpreted to extend to FIG. 6D unless otherwise noted.

Figure 7:
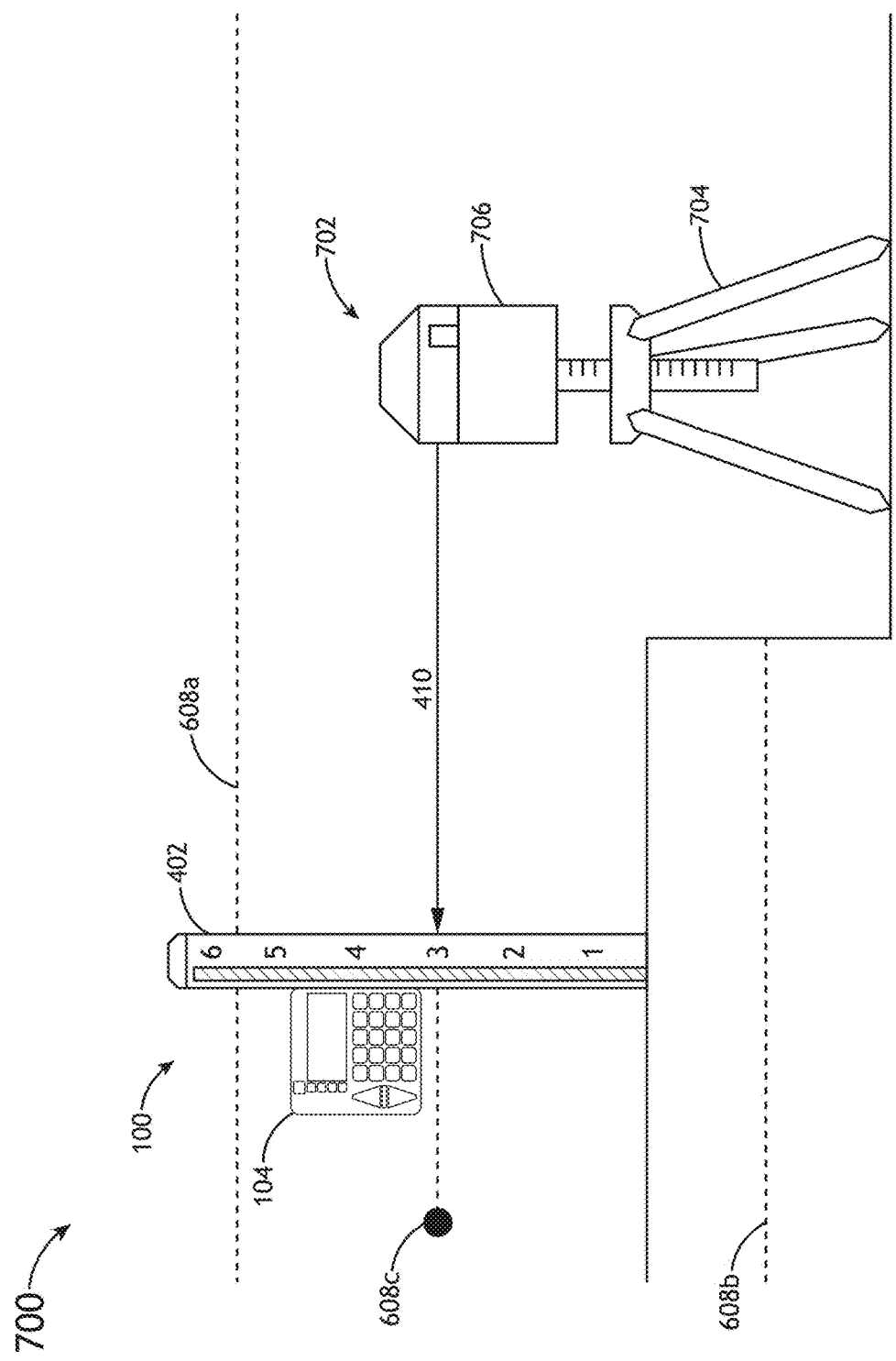
FIG. 7 illustrates a simplified block diagram of a project site being surveyed with a sensor rod assembly, in accordance with one or more embodiments of the present disclosure.

FIG. 7 illustrates a system 700 including the sensor rod assembly 100, in accordance with one or more embodiments of the present disclosure.

In one embodiment, the system 700 includes the sensor rod assembly 100. For example, the sensor rod assembly 100 includes the sensor rod 402. In addition, the sensor rod assembly 100 includes the controller 104. In another embodiment, the system 700 receives the benchmark elevation 608a. In another embodiment, the system 700 receives the target elevation 608b. It is noted that the target elevation height 608b may alternatively be a reference plane.

In one embodiment, the system 700 includes a laser level assembly 702. In another embodiment, the laser level assembly 702 includes a support device 704. For example, the support device 704 may be a tripod. Alternatively, the support device 704 may include, but is not limited to, a pre-fabricated device, a custom-built device specific to the project site, or a temporary structure utilized when desired, such as a box, a tailgate, or a truck bed.

In another embodiment, the laser level assembly 702 includes a laser 706. For example, the laser 706 may be a rotary laser. Alternatively, the laser 706 may be either of a fixed single-point or fixed multi-point laser. In another embodiment, the laser 706 is coupled to the support device 704. It is contemplated, however, that the support device 704 may not be necessary, and that the laser 706 may instead be placed directly on the ground. In another embodiment, the laser 706 emits a laser beam 410 at the laser-sensor registered elevation 608c.

In one embodiment, the laser level assembly 702 is set up and the laser beam 410 is positioned within a range including a known benchmark 608a (e.g., 1000.00 feet) and a target elevation 608b (e.g., 998.50 feet). In another embodiment, the user sets up the sensor rod assembly 100 at a known elevation. For example, the known elevation may be the benchmark elevation, an elevation recorded on an engineering drawing, or another elevation at the project site.

In another embodiment, the user presses the button 610 on the controller 104, enters the value benchmark elevation (e.g., 1000.00) and presses a SET button 606 on the user input device 230 until the controller 104 displays the value as benchmark elevation 608a. In another embodiment, the controller 104 also displays the benchmark laser height for value 608d (e.g., 2.00 feet).

In another embodiment, the user presses the button 612 on the controller 104, enters the target elevation value (e.g., 998.50), and presses the SET button 606 on the user input device 230 until the controller 104 displays the value as target elevation 608b. In an alternative embodiment, in the case of a benchmark elevation of 1000 feet and a target elevation of 998.5 feet, the target elevation 130b may be inputted by the user pressing the button 612 and entering "1000.00-1.5" into the user input device 230 before pressing the SET button 606. Upon setting value 608b as the target elevation, the controller 104 will calculate and display the target laser height needed to achieve the target elevation (e.g., 3.50 feet for value 608e).

In another embodiment, the sensor rod assembly 100 registers the position/height of the laser beam 410 from the laser level assembly 702, recording that value as the current laser-sensor registered height 608f. In another embodiment, upon registering value 608f, the controller 104 may calculate and display the current laser-sensor registered elevation 608c (e.g., 999.25 feet).

It is noted that the sensor rod 402 may have a length other than six feet. In addition, the sensor rod 402 may include telescoping capabilities instead of being a rigid pole, allowing for greater ease of storage and carrying. Further, the sensor rod 402 may include coupling components (e.g. male/female plug, screw-in socket, or snap-fit components) that allows multiple sensor rods 102 to be coupled together (e.g., the master stick 102 and the one or more extension sticks 106, as described in detail previously herein). When multiple elevation rods 102 are coupled together the internal circuitry of the sensor rods 402 may also be connected together, giving the controller 104 additional elevation rod length for use in determining the current elevation.

In another embodiment, the sensor rod 402 may be mountable to a machine or machinery. For example, the sensor rod 402 may be mountable to an excavator, a grader, and the like. In this embodiment, the controller 104 associated with and mounted on the sensor rod 402 may be paired (e.g., BLUETOOTH, LEBT, Wi-Fi, and the like) to a mobile device or a device disposed within a cab of the particular machinery. In this regard, all of the embodiments, components, and functions described previously herein may be extended to a machine-mounted configuration of the present disclosure. For instance, the sensor rod 402 may be coupled to a bucket on a loader, whereby the controller 104 communicates with the user interface device 226 of a mobile device 412 in the cab of the loader with the operator. Where determining an elevation is desired, the operator may set the bucket on the ground, reading the current laser-sensor registered height on the user interface device 226 in the cab. The operator of the loader may repeat this process, as the laser height is never altered. Thus, measuring elevation for a project site may be completed more efficiently by a single individual (i.e. the operator of the loader). It is further contemplated that such a set-up would allow the operator of the loader to grade the project site as necessary more easily, as the necessary altering of elevations would be readily apparent from the sensor rod readings on the user interface device 226 in the cab.

Figure 8:
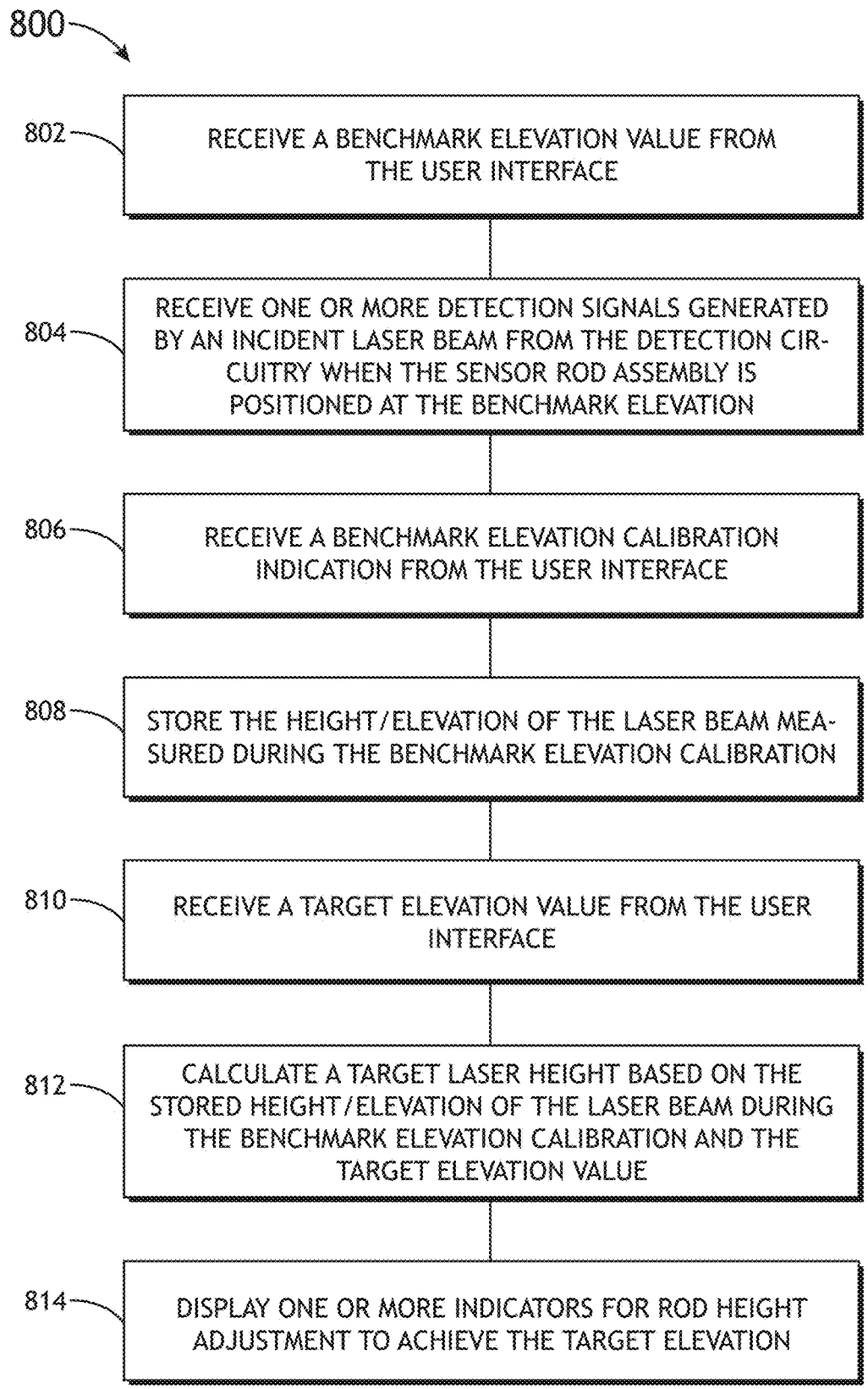
FIG. 8 is a method for achieving target elevations with a sensor rod assembly, in accordance with one or more embodiments of the present disclosure.

FIG. 8 illustrates a process flow diagram depicting a method 800 for achieving target elevations with the sensor rod assembly 100, in accordance with one or more embodiments of the present disclosure. It is noted herein that the steps of method 800 may be implemented all or in part by the system 700. It is further recognized, however, that the method 800 is not limited to the system 700 in that additional or alternative system-level embodiments may carry out all or part of the steps of method 800.

In a step 802, a benchmark elevation value input is received from the user interface device 226. In step 804, one or more detection signals generated by an incident laser beam when the sensor rod assembly 100 is positioned at the benchmark elevation are received from the detection circuitry 310 or 408. In step 806, a benchmark elevation calibration indication is received from the user interface device 226. In step 808, a parameter indicative of at least one of the height or elevation of the laser beam measured during the benchmark elevation calibration is stored. In step 810, a target elevation value input is received from the user interface device 226. In step 812, a target laser height based on the stored parameter indicative of at least one of the height or elevation of the laser beam during the benchmark elevation calibration and the inputted target elevation value is calculated. In step 814, one or more indicators for rod height adjustment of the sensor rod assembly 100 (e.g., the master stick 102, the combination master stick 102 and one or more extension sticks 106, or the sensor rod 402) to achieve the target elevation are displayed on the display device 228.

Figure 9:
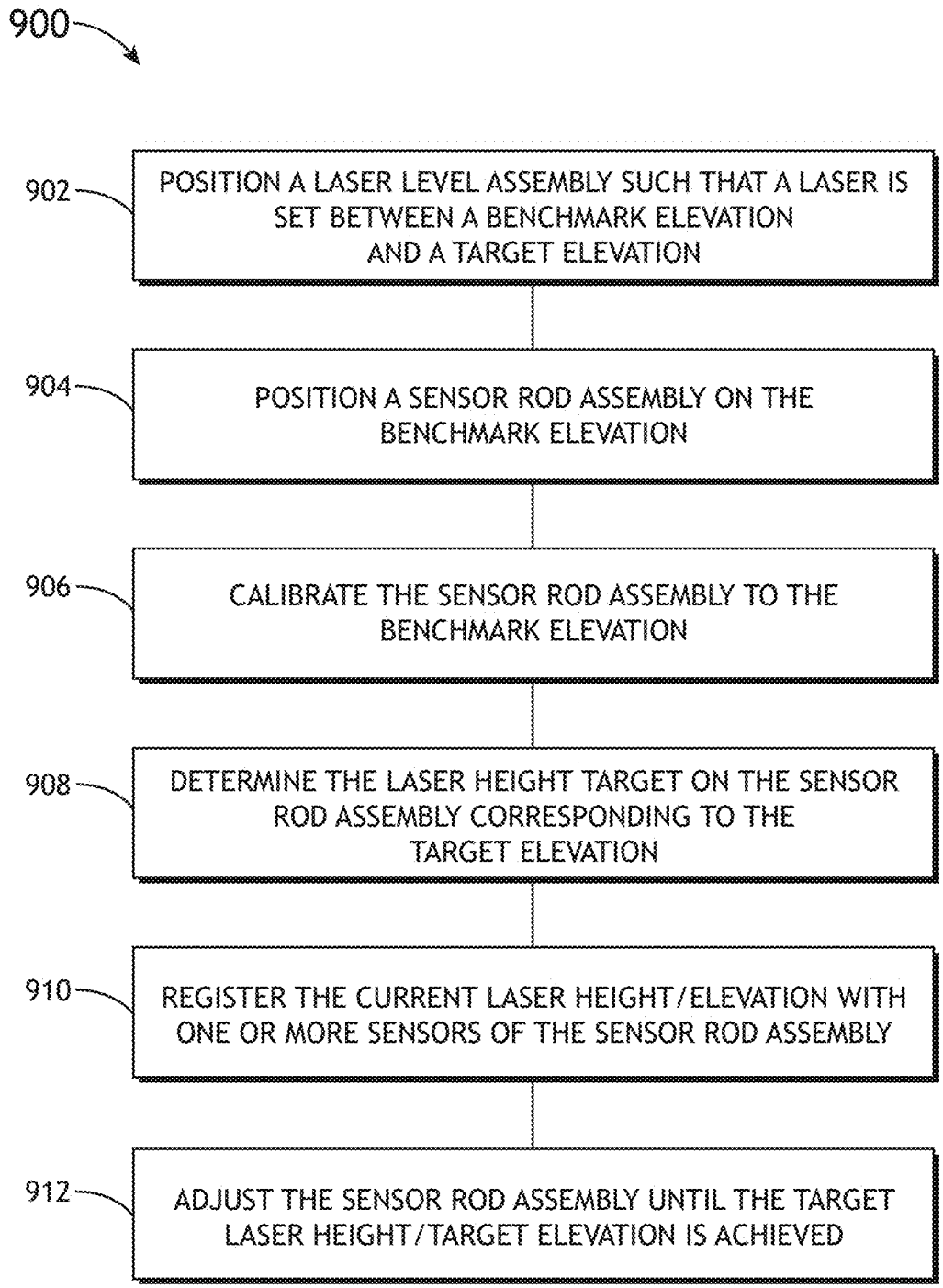
FIG. 9 is a method for measuring and calculating elevation grades at a project site with a sensor rod assembly, in accordance with one or more embodiments of the present disclosure.

FIG. 9 illustrates a process flow diagram depicting a method 900 for measuring elevations at a project site, in accordance with one or more embodiments of the present disclosure. It is noted herein that the steps of method 900 may be implemented all or in part by the system 700. It is further recognized, however, that the method 900 is not limited to the system 700 in that additional or alternative system-level embodiments may carry out all or part of the steps of method 900.

In step 902, a laser level assembly 702 is positioned and a laser 706 is set between a benchmark elevation 608a and a target elevation 608b. For example, the laser 706 may be initially set based on sight approximation. Once positioned, the laser level assembly 702 is turned on, allowing time for the laser 706 to self-level.

In step 904, a sensor rod assembly 100 is positioned on a known elevation or the benchmark elevation 608a. For example, the known elevation and/or the benchmark elevation 608a may be recorded on an engineering drawing or correspond to another elevation at the project site. Once positioned, the sensor rod assembly 100 is turned on with a power button, the power button either on the master stick 102, the combination master stick 102 and one or more extension sticks 106, the sensor rod 402, or the controller 104.

In step 906, the sensor rod assembly 100 is calibrated to the benchmark elevation 608a. In one embodiment, the user presses a benchmark elevation input button 610 on the controller 104, enters the benchmark elevation 608a on a user interface device 226, and presses a SET button 606 until the user interface device 226 displays the benchmark elevation value. In another embodiment, the controller 104 calculates and displays a corresponding benchmark laser height value.

In step 908, the laser height target 608e on the sensor rod assembly 100 corresponding to the target elevation 608b is determined. In one embodiment, the user presses a target elevation input button 612 on the user interface device 226, enters the target elevation 608b on the user input device 230, and presses the SET button 606 until the user interface device 226 displays the target elevation value. In another embodiment, pressing the target elevation input button 612 will alternatively allow the user to calculate the target elevation 608b based upon a given elevation via the user input device 230 commands, should the user be unsure of the target elevation 608b. In another embodiment, the controller 104 calculates and displays a corresponding target laser height value necessary to achieve the target elevation value.

In step 910, a laser elevation or height is registered with the set of sensor devices 406. In one embodiment, the controller 104 may display a current laser-sensor registered height 608f received from the sensor rod assembly 100. In another embodiment, the controller 104 calculates and displays a corresponding laser-sensor registered elevation once the laser-sensor registered height 608f is registered.

In step 912, the controller 104 provides instructions for adjusting the sensor rod assembly 100 until the target elevation/height 608b is achieved. For example, the sensor rod assembly 100 may be raised or lowered (e.g., by adding or removing ground beneath the sensor rod assembly 100) until the target elevation 608b is registered. In one embodiment, the controller 104 may activate a light indicating the direction the sensor rod assembly 100 should be adjusted. In another embodiment, the controller 104 may emit a sound indicating the laser-sensor registered elevation 608c is in relative proximity to the target elevation 608b.

While implementations of method 800, 900 are discussed herein, it is further contemplated that various steps of methods 800, 900 may be included, excluded, rearranged, and/or implemented in many ways without departing from the essence of the present disclosure. Accordingly, the foregoing embodiments and implementations of methods 800, 900 are included by way of example only and are not intended to limit the present disclosure in any way.

All of the methods described herein may include storing results of one or more steps of the method embodiments in memory 222. The results may include any of the results described herein and may be stored in any manner known in the art. The memory 222 may include any memory 222 described herein or any other suitable storage medium known in the art. After the results have been stored, the results can be accessed in the memory 222 and used by any of the method or system embodiments described herein, formatted for display to a user, used by another software module, method, or system, and the like. Furthermore, the results may be stored "permanently," "semi-permanently," temporarily," or for some period of time. For example, the memory 222 may be random access memory 222 (RAM), and the results may not necessarily persist indefinitely in the memory 222.

It is further contemplated that each of the embodiments of the methods 800, 900 described above may include any other step(s) of any other method(s) described herein. In addition, each of the embodiments of the methods 800, 900 described above may be performed by any of the systems described herein.

Figure 10A:
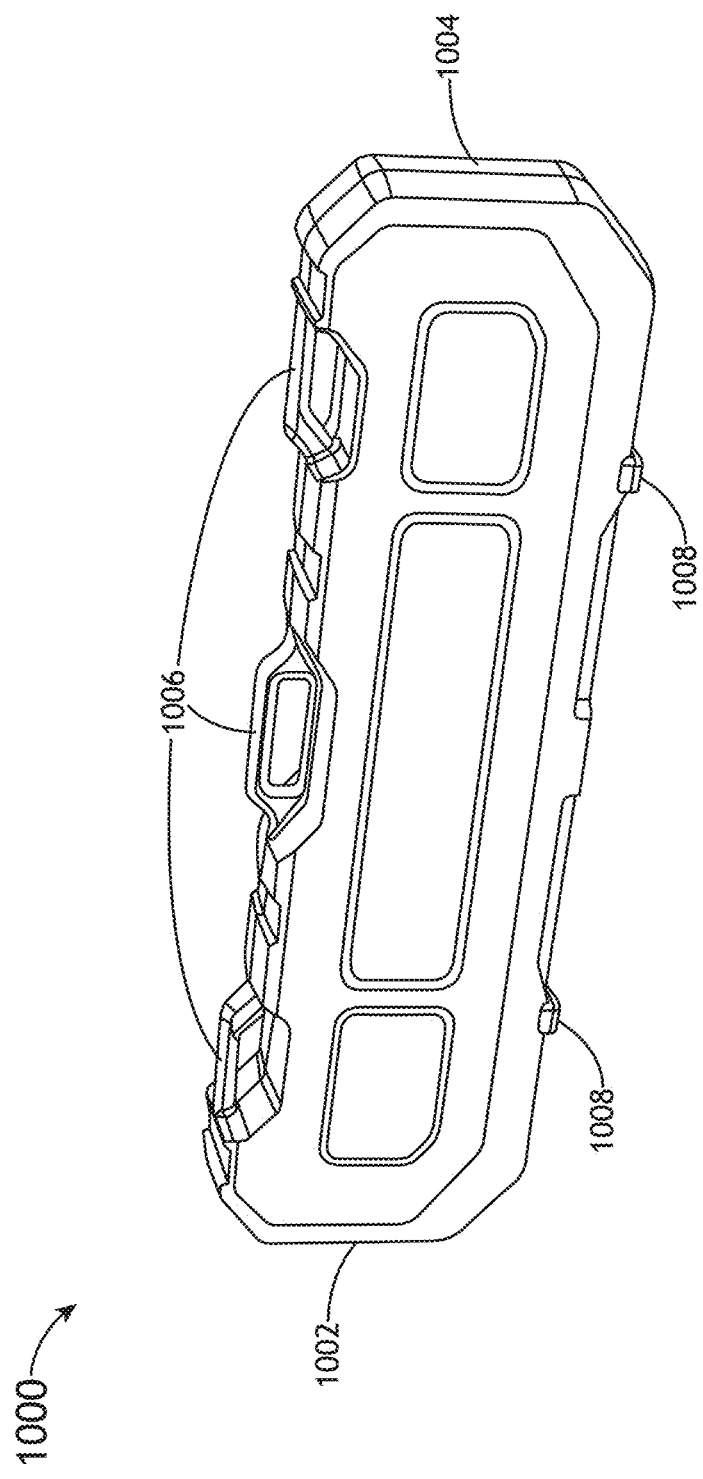
FIG. 10A illustrates a case for a sensor rod assembly, in accordance with one or more embodiments of the present disclosure.
Figure 10B:
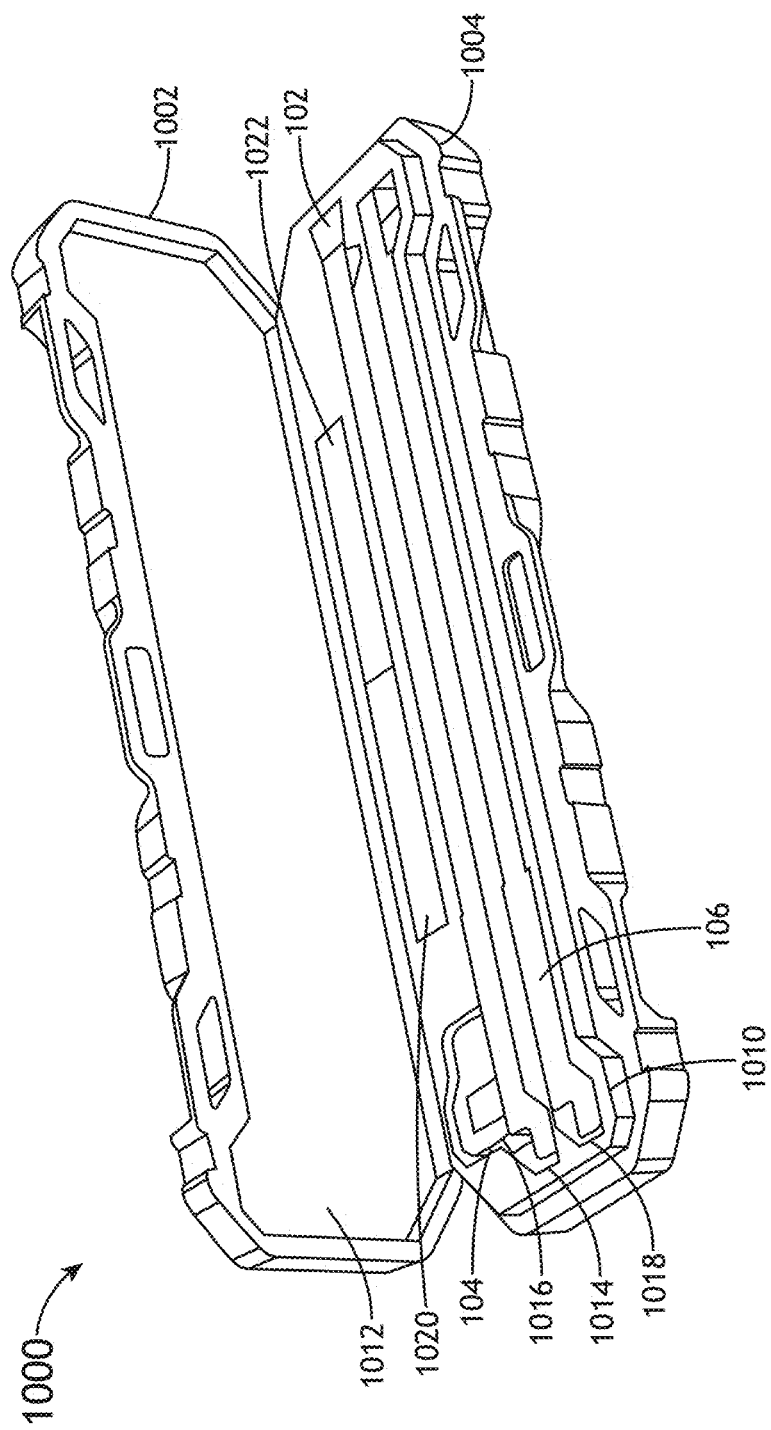
FIG. 10B illustrates a case for a sensor rod assembly, in accordance with one or more embodiments of the present disclosure.
Figure 10C:
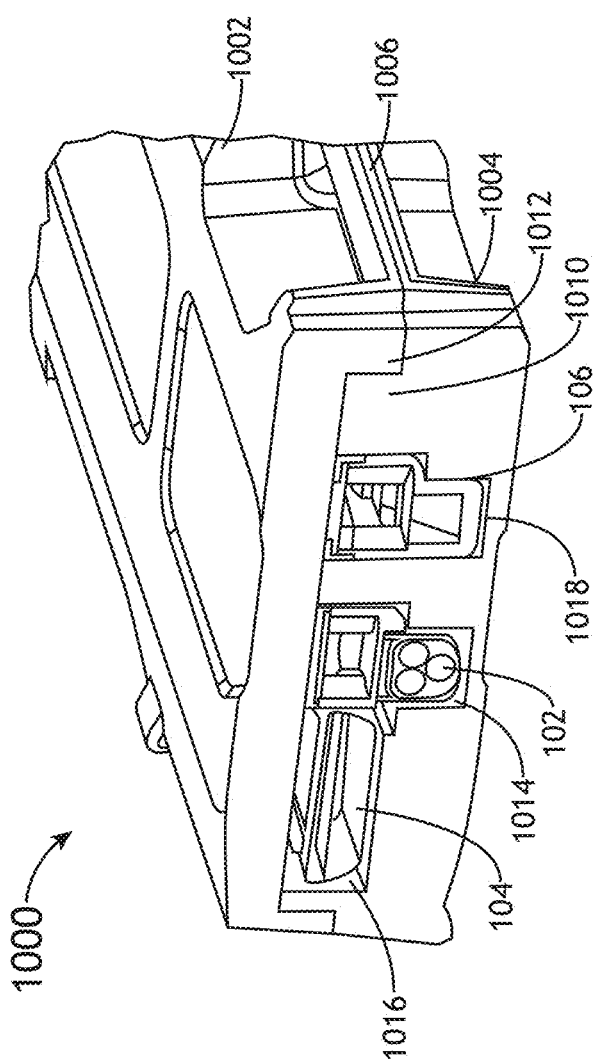
FIG. 10C illustrates a portion of a case for a sensor rod assembly, in accordance with one or more embodiments of the present disclosure.

FIGS. 10A-10C in general illustrate a case 1000 for the sensor rod assembly 100, in accordance with one or more embodiments of the disclosure.

In one embodiment, the case 1000 includes a body 1002 and a lid 1004. For example, the body 1002 and the lid 1004 may be each approximately half of a thickness of the case 1000. By way of another example, the body 1002 may represent a majority of the thickness of the case 1000, and the lid 1004 may be a smaller portion of the thickness of the case 1000.

In another embodiment, the case 1000 includes one or more handles 1006. For example, the one or more handles 1006 may be positioned on any surface (e.g., front, rear, side, top, bottom) of the case 1000. For instance, the one or more handles may be fully coupled to or integrated with a part of the body 1002 or the lid 1004. In addition, the one or more handles may be coupled to or integrated with a part of the body 1002 and a part of the lid 1004. In another embodiment, the case 1000 includes one or more feet or support structures 1008. For example, the one or more feet or support structures 1008 may be positioned on any surface (e.g., front, rear, side, top, bottom) of the case 1000. For instance, the one or more feet or support structures 1008 may provide stability when the case 1000 is standing on end and/or may prevent sliding when the case 1000 is laid flat.

In another embodiment, the case 1000 includes one or more hinges. For example, the one or more hinges may include a fixed hinge (e.g., to hold the lid 1004 to the body 1002) or a break-apart hinge (e.g., to allow for removal of the lid 1004 from the body 1002). In another embodiment, the case 1000 includes one or more connectors (e.g., clasps, straps, or the like) configured to hold the lid 1004 to the body 1002 when closed. It is noted herein, however, the case 1000 may only include clasps, allowing for full removability of the lid 1004, such that the one or more hinges are not necessary.

In another embodiment, the case 1000 is fabricated (e.g., formed, molded, or the like) with an internal portion 1010 of the body 1002 that fits within an internal portion 1012 of the lid 1004. In this regard, the case 1000 may not include a flat dividing surface, but instead may include at least two heights of dividing surfaces. It is noted herein, however, the case 1000 may be fabricated (e.g., formed, molded, or the like) such that the internal portion 1012 of the lid 1004 fits within the internal portion 1010 of the body 1002.

In another embodiment, the internal portion 1010 of the body 1002 and/or the internal portion 1012 of the lid 1004 includes one or more cut-outs or molded sections configured to receive the sensor rod assembly 100. For example, the internal portion 1010 of the body 1002 and/or the internal portion 1012 of the lid 1004 may include a cut-out or molded section 1014 for the master stick 102. By way of another example, the internal portion 1010 of the body 1002 and/or the internal portion 1012 of the lid 1004 may include a cut-out or molded section 1016 for the controller 104. By way of another example, the internal portion 1010 of the body 1002 and/or the internal portion 1012 of the lid 1004 may include a cut-out or molded section 1018 for the extension stick 106. It is noted herein the one or more cut-outs or molded sections 1014 may be continuous. In this regard, the sensor rod assembly 100 may not move within the case 1000 during transport.

In another embodiment, the internal portion 1010 of the body 1002 and/or the internal portion 1012 of the lid 1004 includes one or more storage compartments 1020. For example, one or more storage compartments 1020 may be configured to house additional batteries for the sensor rod assembly 100, a charger for the additional batteries for the sensor rod assembly 100, a charger for batteries housed internally within the sensor rod assembly 100, additional caps 108, contact surfaces for the primary foot 124 and/or the secondary foot 126, or the like.

In another embodiment, the internal portion 1010 of the body 1002 and/or the internal portion 1012 of the lid 1004 includes charging circuitry 1022. For example, the charging circuitry 1022 may include components configured to couple the master stick 102, the controller 104, and/or the extension stick 106 when inserted in the case 1000. For instance, the charging circuitry 1022 may include internal batteries configured to charge the master stick 102, the controller 104, and/or the extension stick 106 when inserted in the case 1000. By way of another example, the charging circuitry 1022 may include external components configured to charge the internal batteries. In this regard, the case 1000 may charge the master stick 102, the controller 104, and/or the extension stick 106 when inserted in the case 1000 to improve field usage.

Advantages of the present disclosure are directed to a sensor rod assembly for detecting a laser beam from a corresponding laser level and automatically calculating instructions for a user. Such instructions may include required adjustments necessary to reach a target elevation, the amount a user must remove or add to the surface to reach the target elevation (i.e., the cut or fill amount), or instructions for forming graded or sloped surface.

One skilled in the art will recognize that the herein described components operations, devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components, operations, devices, and objects should not be taken as limiting.

As used herein, directional terms such as "top," "bottom," "over," "under," "upper," "upward," "lower," "down," and "downward" are intended to provide relative positions for purposes of description, and are not intended to designate an absolute frame of reference. Various modifications to the described embodiments will be apparent to those with skill in the art, and the general principles defined herein may be applied to other embodiments With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A sensor rod assembly, comprising:
   a master stick;
   an extension stick, wherein the master stick and the at least one extension stick are couplable together via at least one of a physical coupling, an electrical coupling, or a communicative coupling; and
   a controller, wherein the controller includes one or more processors, wherein the one or more processors are communicatively coupled to at least one set of detection circuitry and a user interface device, wherein the one or more processors are configured to execute a set of program instructions configured to cause the one or more processors to:
   receive one or more detection signals from at least one of the master stick or the extension stick; and
   determine an elevation of a laser light based on the received one or more detection signals.

2. The sensor rod assembly of claim 1, wherein the master stick comprises:
   at least one sensor board, wherein the at least one sensor board includes at least one set of a plurality of sensor devices; and
   the at least one set of detection circuitry, wherein the at least one set of detection circuitry is coupled to the at least one set of the plurality of sensor devices, wherein the at least one set of detection circuitry is configured to receive an output of a particular sensor device of the at least one set of the plurality of sensor devices, wherein the output is generated following the particular sensor device of the at least one set of the plurality of sensor devices detecting laser light,
   wherein the one or more detection signals are based on the output of the particular sensor device of the at least one set of the plurality of sensor devices.

3. The sensor rod assembly of claim 1, wherein the extension stick comprises:
   at least one sensor board, wherein the at least one sensor board includes at least one set of a plurality of sensor devices; and
   the at least one set of detection circuitry, wherein the at least one set of detection circuitry is coupled to the at least one set of the plurality of sensor devices, wherein the at least one set of detection circuitry is configured to receive an output of a particular sensor device of the at least one set of the plurality of sensor devices, wherein the output is generated following the particular sensor device of the at least one set of the plurality of sensor devices detecting laser light,
   wherein the one or more detection signals are based on the output of the particular sensor device of the at least one set of the plurality of sensor devices.

4. A sensor rod assembly, comprising:
   a master stick, comprising:
   at least one sensor board, wherein the at least one sensor board includes at least one set of a plurality of sensor devices; and
   at least one set of detection circuitry, wherein the at least one set of detection circuitry is coupled to the at least one set of the plurality of sensor devices, wherein the at least one set of detection circuitry is configured to receive an output of a particular sensor device of the at least one set of the plurality of sensor devices, wherein the output is generated following the particular sensor device of the at least one set of the plurality of sensor devices detecting laser light; and
   a controller, wherein the controller includes one or more processors, wherein the one or more processors are communicatively coupled to the at least one set of detection circuitry and a user interface device, wherein the one or more processors are configured to execute a set of program instructions configured to cause the one or more processors to:
   receive one or more detection signals from the at least one set of detection circuitry, wherein the one or more detection signals are based on the output of the particular sensor device of the at least one set of the plurality of sensor devices; and
determine an elevation of a laser light based on the received one or more detection signals from the at least one set of detection circuitry.

5. The sensor rod assembly of claim 4, wherein the output of the particular sensor device of the at least one set of the plurality of sensor devices is generated following the particular sensor device of the at least one set of the plurality of sensor devices detecting laser light from a laser level.

6. The sensor rod assembly of claim 4, wherein the at least one sensor board of the master stick comprises:
a top sensor board disposed on the master stick, wherein the top sensor board includes a first set of a first plurality of sensor devices;
at least one middle sensor board disposed on the master stick and in electric communication with the top sensor board disposed on the master stick, wherein the at least one middle sensor board includes a second set of a second plurality of sensor devices; and
a bottom board disposed on the master stick and in electric communication with the at least one middle sensor board disposed on the master stick, wherein the bottom sensor board includes a third set of a third plurality of sensor devices.

7. The sensor rod assembly of claim 4, wherein the master stick further comprises:
a housing and a faceplate, wherein the at least one sensor board of the master stick is disposed within the housing.

8. The sensor rod assembly of claim 4, further comprising: the user interface device.

9. The sensor rod assembly of claim 4, further comprising: at least one extension stick, comprising:
at least one sensor board, wherein the at least one sensor board includes at least one set of a plurality of sensor devices;
at least one set of detection circuitry, wherein the at least one set of detection circuitry is coupled to the at least one set of the plurality of sensor devices, wherein the at least one set of detection circuitry is configured to receive an output of a particular sensor device of the at least one set of the plurality of sensor devices, wherein the output is generated following the particular sensor device of the at least one set of the plurality of sensor devices detecting laser light,
wherein the master stick and the at least one extension stick are couplable together via a set of electrical couplers.

10. The sensor rod assembly of claim 7, wherein the controller is mechanically coupled to the housing.

11. The sensor rod assembly of claim 7, wherein the controller is separated from the housing.

12. The sensor rod assembly of claim 8, wherein the user interface device and the controller form an integrated unit.

13. The sensor rod assembly of claim 8, wherein the user interface device is included in a mobile device, wherein the one or more processors of the controller are communicatively coupled to the mobile device via a wireless connection.

14. The sensor rod assembly of claim 8, wherein the user interface device is configured to receive inputs from at least one user input device.

15. The sensor rod assembly of claim 8, wherein the one or more processors are further configured to:
display, on the user interface device, at least one of a cut amount or a fill amount to achieve a target elevation.

16. The sensor rod assembly of claim 8, wherein the one or more processors are further configured to:
display, on the user interface device, one or more instructions for performing a sloping function.

17. The sensor rod assembly of claim 9, wherein the at least one sensor board of the at least one extension stick comprises:
a top sensor board disposed on the at least one extension stick, wherein the top sensor board includes a first set of a first plurality of sensor devices;
at least one middle sensor board disposed on the at least one extension stick and in electric communication with the top sensor board disposed on the at least one extension stick, wherein the at least one middle sensor board includes a second set of a second plurality of sensor devices; and
a bottom board disposed on the at least one extension stick and in electric communication with the at least one middle sensor board disposed on the at least one extension stick, wherein the bottom sensor board includes a third set of a third plurality of sensor devices.

18. The sensor rod assembly of claim 9, wherein the master stick and the at least one extension stick are couplable together via an interlocking assembly.

19. The sensor rod assembly of claim 11, wherein the controller is reversibly attachable to the housing.

20. The sensor rod assembly of claim 14, wherein the one or more processors are further configured to:
receive a benchmark elevation value input from the user interface device;
receive a benchmark elevation calibration indication from the user interface device;
store a parameter indicative of the elevation of the one or more detection signals measured during the benchmark elevation calibration;
receive a target elevation value input from the user interface device;
calculate a target laser height based on the stored parameter indicative of the elevation of the one or more detection signals during the benchmark elevation calibration and the inputted target elevation value; and
display, on the user interface device, one or more indicators for rod height adjustment of the sensor rod assembly to achieve the target elevation.

21. The sensor rod assembly of claim 17, wherein the top sensor board of the master stick is in electric communication with an electrical coupler of the set of electrical couplers and the bottom sensor board of the at least one extension stick is in electric communication with an electrical coupler of the set of electrical couplers.

22. The sensor rod assembly of claim 17, wherein the at least one middle board of the at least one extension stick includes a first middle sensor board and a second middle sensor board, wherein the first middle sensor board is in electric communication with the top sensor board, wherein the second middle sensor board is in electric communication with the first middle sensor board, wherein the bottom sensor board is in electric communication with the second middle sensor board.

23. The sensor rod assembly of claim 17, wherein the set of electrical couplers is a first set of electrical couplers, wherein the at least one extension stick includes a first extension stick and a second extension stick, wherein the first extension stick is couplable to the master stick via the first set of electrical couplers, wherein the second extension stick is couplable to the first extension stick via a second set of electrical couplers.

24. The sensor rod assembly of claim 20, wherein the user interface device further comprises:
   a display device, wherein at least one indicator includes at least one graphical output on the display device.

25. The sensor rod assembly of claim 20, wherein the user interface device further comprises:
   at least one light, wherein at least one indicator includes at least one visual output via the at least one light.

26. The sensor rod assembly of claim 20, wherein the user interface device further comprises:
   a speaker, wherein at least one indicator includes at least one auditory output via the speaker.

27. A sensor rod assembly, comprising:
   a master stick, comprising:
      at least one sensor board, wherein the at least one sensor board includes at least one set of a plurality of sensor devices; and
      at least one set of detection circuitry, wherein the at least one set of detection circuitry is coupled to the at least one set of the plurality of sensor devices, wherein the at least one set of detection circuitry is configured to receive an output of a particular sensor device of the at least one set of the plurality of sensor devices, wherein the output is generated following the particular sensor device of the at least one set of the plurality of sensor devices detecting laser light;
   a user interface device; and
   a controller, wherein the controller includes one or more processors, wherein the one or more processors are communicatively coupled to the at least one set of detection circuitry and the user interface device, wherein the one or more processors are configured to execute a set of program instructions configured to cause the one or more processors to:
      receive a benchmark elevation value input from the user interface device;
      receive, from the at least one set of detection circuitry, one or more detection signals generated by an incident laser beam when the sensor rod assembly is positioned at the benchmark elevation;
      receive a benchmark elevation calibration indication from the user interface device;
      store a parameter indicative of the elevation of the laser beam measured during the benchmark elevation calibration;
      receive a target elevation value input from the user interface device;
      calculate a target laser height based on the stored parameter indicative of the elevation of the laser beam during the benchmark elevation calibration and the inputted target elevation value; and
      display, on the user interface device, one or more indicators for rod height adjustment of the sensor rod assembly to achieve the target elevation.

* * * * *